US012775180B2

(12) United States Patent
Xie et al.

(10) Patent No.: US 12,775,180 B2
(45) Date of Patent: Oct. 27, 2026

(54) RING MODULATORS WITH LOW-LOSS AND LARGE FREE SPECTRAL RANGE (FSR) ON A SILICON-ON-INSULATOR (SOI) PLATFORM

(71) Applicant: XILINX, INC., San Jose, CA (US)

(72) Inventors: Chuan Xie, Fremont, CA (US); Mayank Raj, San Jose, CA (US); Anish Joshi, San Jose, CA (US); Zakriya Mohammed, San Jose, CA (US); Gareeyasee Saha, San Jose, CA (US); Parag Upadhyaya, Los Gatos, CA (US); Yohan Frans, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 538 days.

(21) Appl. No.: 18/143,846

(22) Filed: May 5, 2023

(65) Prior Publication Data

US 2024/0369864 A1 Nov. 7, 2024

(51) Int. Cl.
*G02F 1/025* (2006.01)
*G02F 1/01* (2006.01)

(52) U.S. Cl.
CPC ............ *G02F 1/025* (2013.01); *G02F 1/0147* (2013.01); *G02F 2201/063* (2013.01)

(58) Field of Classification Search
CPC .. G02F 1/025; G02F 1/0147; G02F 2201/063; G02F 1/2257; G02B 6/29341; G02B 6/29343; G02B 6/12007
See application file for complete search history.

(56) References Cited

U.S. PATENT DOCUMENTS 10,075,245 B2 * 9/2018 Caplan .................. H04B 10/66

* cited by examiner

*Primary Examiner* — John Bedtelyon
(74) *Attorney, Agent, or Firm* — Patterson + Sheridan, LLP

(57) ABSTRACT

A silicon-on-insulator (SOI) dense-wavelength-division-multiplexing (DWDM) device includes micro-ring modulators (MRMs) having radii under 5 micrometers. A 16-channel embodiment may provide a free spectral range of 3.2 THz, 200 GHz channel spacing, 41 GHz bandwidth, and a Q factor of 4500. PN junctions of rib ring waveguides (RWRs) may be perpendicular or parallel with a plane of the RWRs. On-chip inductive components may be used to match reactances of the PN junctions. The RWRs may be relatively wide and a rib bus waveguide may be relatively narrow (e.g., narrower than the RWRs). MRM outer slabs may be wider than inner slabs. Regions inside and outside of the RWRs, including slabs at optical coupling gaps may be doped to improve modulation efficiency. Regions of the rib bus waveguide distant from the optical coupling gaps may be undoped. Cavities may be provided below the MRMs and associated heater elements.

18 Claims, 24 Drawing Sheets

RING MODULATORS WITH LOW-LOSS AND LARGE FREE SPECTRAL RANGE (FSR) ON A SILICON-ON-INSULATOR (SOI) PLATFORM

This invention was made with United States (U.S.) government support under Contract No. HR0011-19-3-0004, awarded by the U.S. Defense Advanced Research Projects Agency (DARPA). The U.S. government has certain rights in the invention.

TECHNICAL FIELD

Examples of the present disclosure generally relate to ring modulators with low-loss and large free spectral range (FSR) on a silicon-on-insulator (SOI) platform.

BACKGROUND

For dense wavelength division multiplexing (DWDM), micro ring modulators (MRMs) need a relatively large free spectral range (FSR) to accommodate many optical channels with channel spacing set to minimize inter-channel cross-talk. A large FSR requires rib-waveguide based ring resonator (RWRRs) of the MRMs to have very a small radius. As an example, a DWDM system with 16 MRMs in concatenation for 16 optical channels may need a FSR of 3.2 THz to provide 200 GHz channel spacing. The large FSR necessitates a RWRR radius of less than 5 micrometers (μm) on a conventional silicon-on-insulator platform. Such a small radius, however, increases propagation losses due to optical mode leakage in slabs of the MRM waveguide. Such losses restrict the radius to a range of approximately 5-10 μm, which results in a lower FSR (1.2-2.4 THz). Existing solutions for large FSR ring modulators are complicated and limit bandwidth.

SUMMARY

Techniques for ring modulators with low-loss and large free spectral range (FSR) on a silicon-on-insulator (SOI) platform are described. One example is an apparatus that includes a substrate and a layer of silicon disposed above the substrate. The layer of silicon includes an optical modulation system that includes a bus waveguide that propagates an optical carrier, and a ring modulator that modulates the optical carrier. The ring modulator includes a rib ring waveguide adjacent to the bus waveguide having a center radius less than 5 micrometers.

Another example described herein is an apparatus that includes a substrate and a layer of silicon disposed above the substrate that includes an optical modulation system that includes a bus waveguide that propagates multiple optical carriers simultaneously, and multiple ring modulators that modulate the respective optical carriers. The ring modulators include respective rib ring waveguides adjacent to and disposed along a length of the bus waveguide. Center radii of the rib ring waveguides are less than 5 micrometers.

Another example described herein is method that includes disposing a dielectric layer above a substrate, disposing a silicon layer above the dielectric layer, forming an optical modulation system in the silicon layer, including a bus waveguide that propagates an optical carrier, a ring modulator that modulates the optical carrier, and a heater element that controls a temperature of the ring modulator. The method further includes forming slots through dielectric layer, within regions of the optical modulation system in which the silicon layer is fully removed, to a surface of the substrate, forming a cavity in the substrate, beneath the ring modulator and the heater element, through the slots, and sealing the slots subsequent to forming the cavity.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
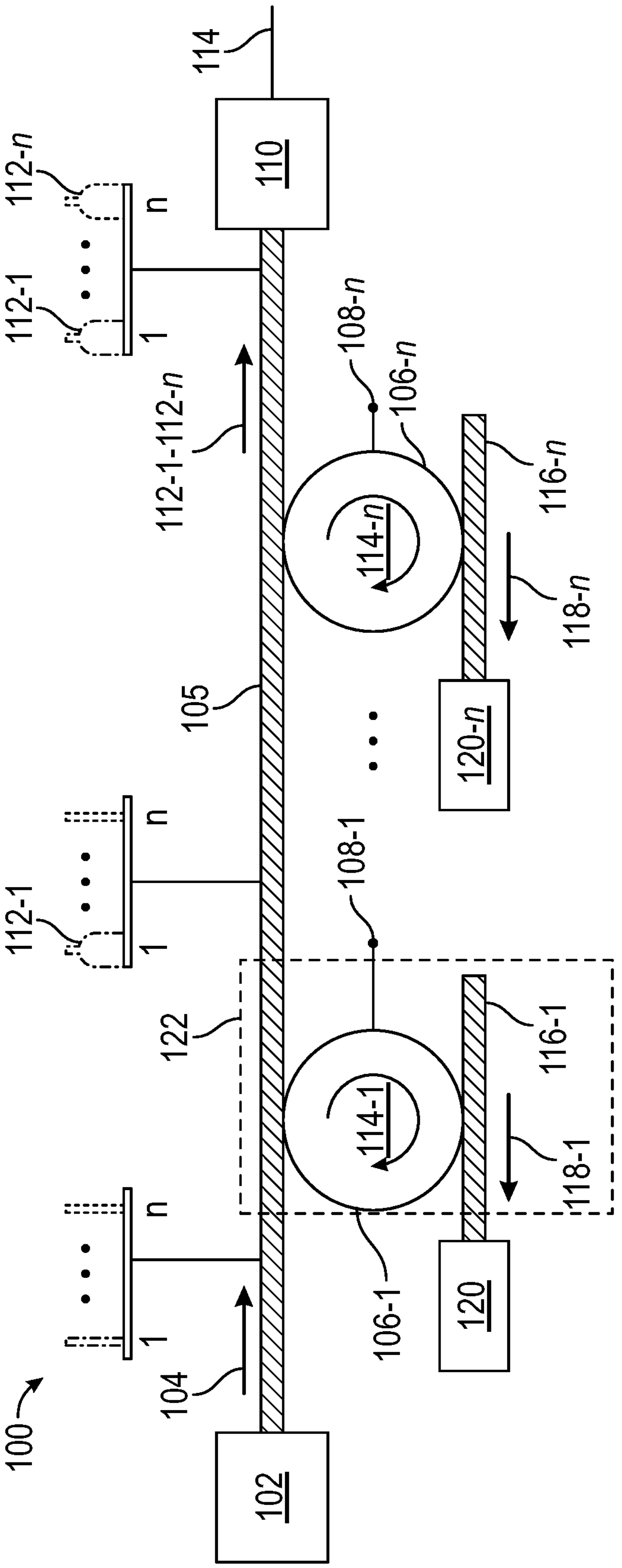
FIG. 1 is a block diagram of an optical system, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe optical ring modulators with low-loss and large free spectral range (FSR) on a silicon-on-insulator (SOI) platform. Optical ring modulators disclosed herein include rib ring waveguides, and may be referred to as micro ring modulators (MRMs). MRMs provide significant advantages over micro disc modulators (MDMs) in terms of modulation bandwidth. MRMs typically have a higher extinction ratio (e.g., larger than 20 dB) on resonance in comparison to MDMs because of the relative ease of meeting the critical coupling condition in design. This is due to the more effective coupling between the rib bus waveguide and the rib ring waveguide of an MRM. MRMs thus may be designed to have a lower Q (between 3500 and 4500 here), which enables operation at symbol rate at or above 50 Giga Baud.

MRMs disclosed herein provide high bandwidth, large free spectral range (FSR), and low loss. Performance metrics (e.g., insertion loss, excitation ratio and modulation efficiency) are state-of-the art for large bandwidth devices. A large FSR (e.g., 3.2 THz) may be useful to reduce inter-channel crosstalk in multi-channel dense wavelength division multiplexing (DWDM) applications by allowing sufficiently wide frequency (or wavelength) spacing between adjacent channels. For example, in a 16-channel DWDM application, a FSR of 3.2 THz may support 200 GHz channel spacing and beyond. MRMs disclosed herein provide a relatively elegant solution (i.e., in terms of physical design simplicity), which may be fabricated on a silicon-on-insulator (SOI) platform using a conventional/commercial silicon photonics fabrication process.

MRMs disclosed herein may be fabricated with a commercial/conventional, large-volume silicon photonic fabrication process, compliant with design rule checks (DRC). This enables the MRMs to be easily integrated with electronic integrated circuits (EIC's) on CMOS nodes, thereby aiding volume production.

MRMs disclosed herein may be useful in the development of co-packaged optical solutions for high bandwidth transceivers following Ethernet standards (e.g., 800 G, 1.6 T, 3.2 T, and beyond).

FIG. 1 is a block diagram of an optical system 100, according to an embodiment. Optical system 100 includes a laser 102 that injects one or more optical carriers 104 to a bus waveguide 105. Optical system 100 further includes one or more ring modulators, illustrated here as micro ring modulators (MRMs) 106-1 through 106-*n* (collectively, MRMs 106), where n is a positive integer. MRMs 106 modulate respective optical carriers 104 with respective data signals 108-1 through 108-*n* (collectively, data signals 108), to provide modulated optical carriers 112-1 through 112-*n*. Optical system 100 further includes a coupler 110 that couples bus waveguide 105 to an optical fiber 114. Optical system 100 may further include drop waveguides 116-1 through 116-*n* (collectively, drop waveguides 116) that provide a fraction of optical power within MRMs 106-1 to 106-*n*, illustrated here as optical power 118-1 to 118-*n*, to photodetectors (PD) 120-1 through 120-*n* for monitoring/test purposes.

Bus waveguide 105, MRMs 106, and drop waveguides 116 may be fabricated in silicon on a silicon on insulator platform.

Figure 2:
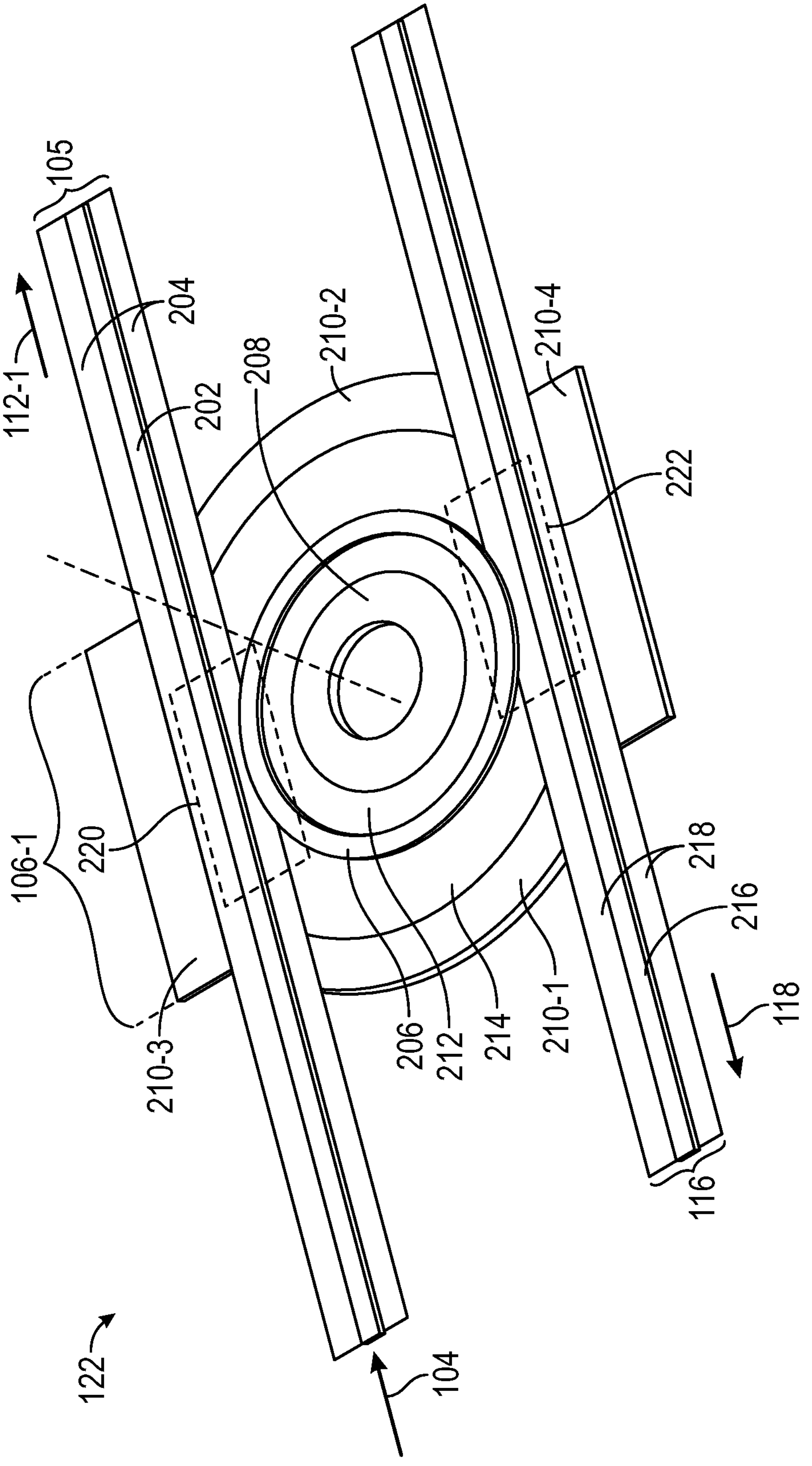
FIG. 2 is a perspective view of a region of the optical system of FIG. 1, according to an embodiment.

FIG. 2 is a perspective view of a region 122 of optical system 100, according to an embodiment.

In the example of FIG. 2, bus waveguide 105 includes a rib bus waveguide 202 and a slab 204. Drop waveguide 116 includes a rib drop waveguide 216 and a slab 218.

Further in FIG. 2, MRM 106-1 includes a rib ring waveguide 206, illustrated here as a solid toroid, and a slab, illustrated here as including an inner slab 212 and an outer slab 214.

MRM 106-1 further includes an inner contact rib 208, and outer contact rib portions 210-1, 210-2, 210-3, and 201-4 (collectively, outer contact rib portions 210). Inner contact rib 208 includes a first set of electrically conductive contacts (e.g., tungsten) formed in vias to receive a first polarity of data signal 108-1 (FIG. 1). Outer contact rib portions 210 include a second set of electrically conductive vias to receive a second polarity of data signal 108-1.

Rib bus waveguide 202, rib ring waveguide 206, inner contact rib 208, outer contact rib portions 210, and rib drop waveguide 216 are collectively referred to herein as "the ribs." Slab 204, slab 218, inner slab 212, and outer slab 214 are collectively referred to herein as "the slabs." In an embodiment, the ribs and the slabs are formed (e.g., etched) in layer of a material having a relatively high index of refraction (e.g., silicon). A height, or thickness of the ribs may be the same for all of the ribs. A height, or thickness of the slabs may be the same for all of the slabs.

Figure 3:
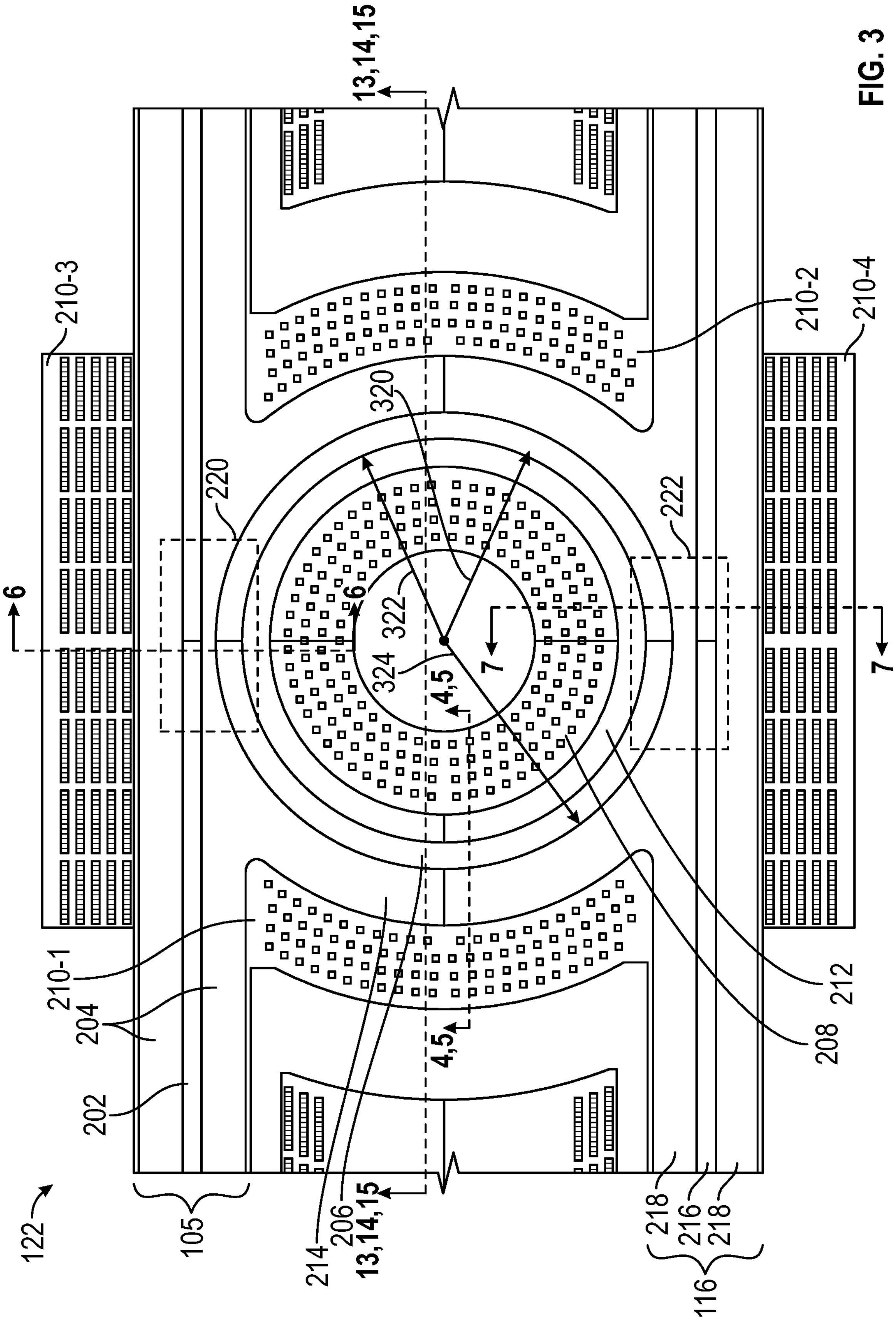
FIG. 3 is a plan view of the region, according to an embodiment.

FIG. 3 is a plan view of region 122, including features described above with reference to FIG. 2, according to an embodiment. In FIG. 3, center, inner, and outer radii of rib ring waveguide 206 are denoted 320, 322 and 324, respectively.

Figure 4:
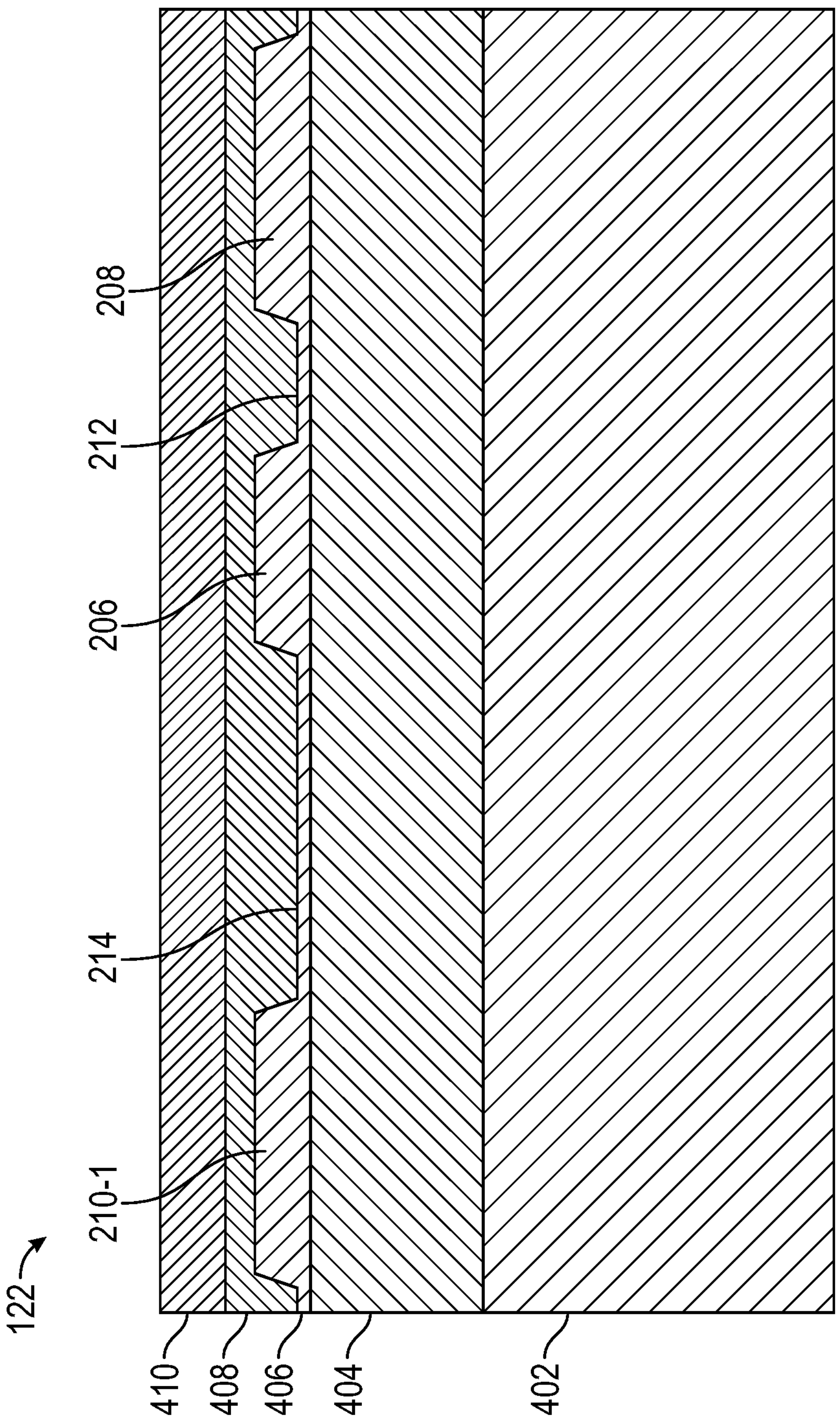
FIG. 4 is a cross-sectional view of the region, corresponding to a view 4 in FIG. 3, according to an embodiment.

FIG. 4 is a cross-sectional view of region 122, corresponding to view 4 in FIG. 3, according to an embodiment. In the example of FIG. 4, region 122 includes a substrate 402 (e.g., silicon), a dielectric layer 404 (e.g., silicon dioxide), a optical layer 406 that includes the slabs and ribs, and cladding 408 (e.g., silicon dioxide). Region 122 may further include one or more additional layers 410, which may include one or more metal layers to provide data signal 108-1 to the first and second sets of electrically conductive contacts of inner contact rib 208 and outer contact rib portions 210.

Heights/thicknesses of substrate 402, dielectric layer 404, optical layer 406, cladding 408, and layer(s) 410 are not drawn to scale. In an embodiment, the ribs of optical layer 406 are several hundred nanometers (nm) thick/high, first dielectric layer 404 is approximately 2 micrometers (μm) thick, and substrate 402 is substantially thicker than dielectric layer 404.

The slabs of optical layer 406 may be formed by etching areas between the ribs of optical layer 406.

Optical layer 406 is made of a material that has a higher index of refraction (e.g., silicon having an index of refraction of approximately 3.5) than a material of dielectric layer 404 and cladding 408 (e.g., e.g., silicon dioxide having an index of refraction less than approximately 1.5).

Figure 5:
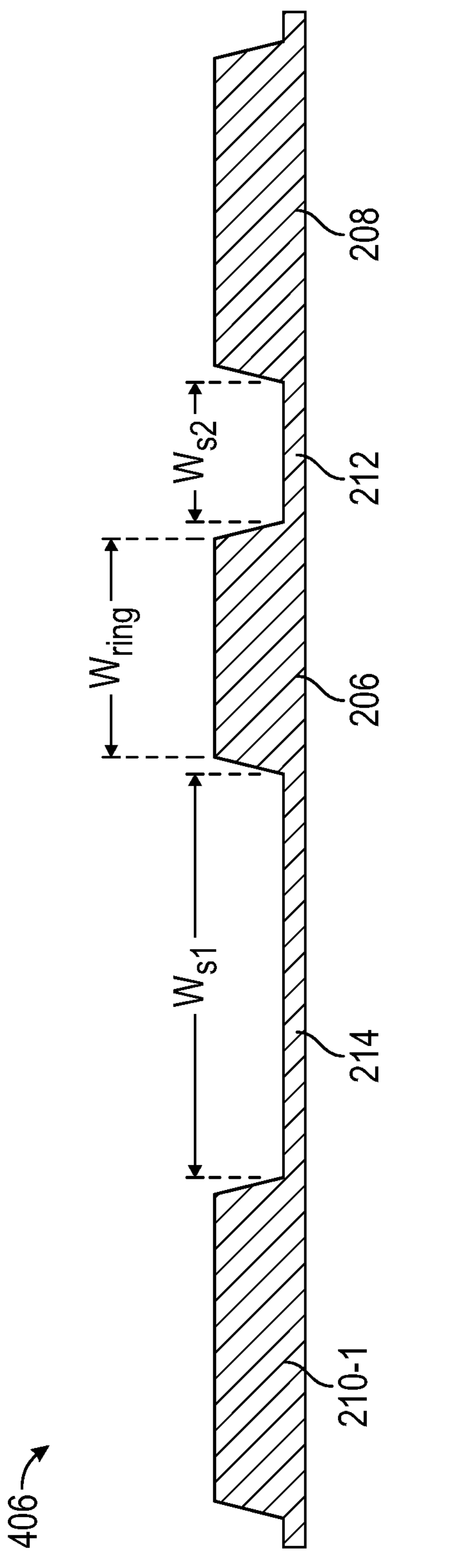
FIG. 5 is a cross-sectional view of an optical layer of the region, corresponding to view 5 in FIG. 3, according to an embodiment.

FIG. 5 is a cross-sectional view of optical layer 406, corresponding to view 5 in FIG. 3, according to an embodiment.

Figure 6:
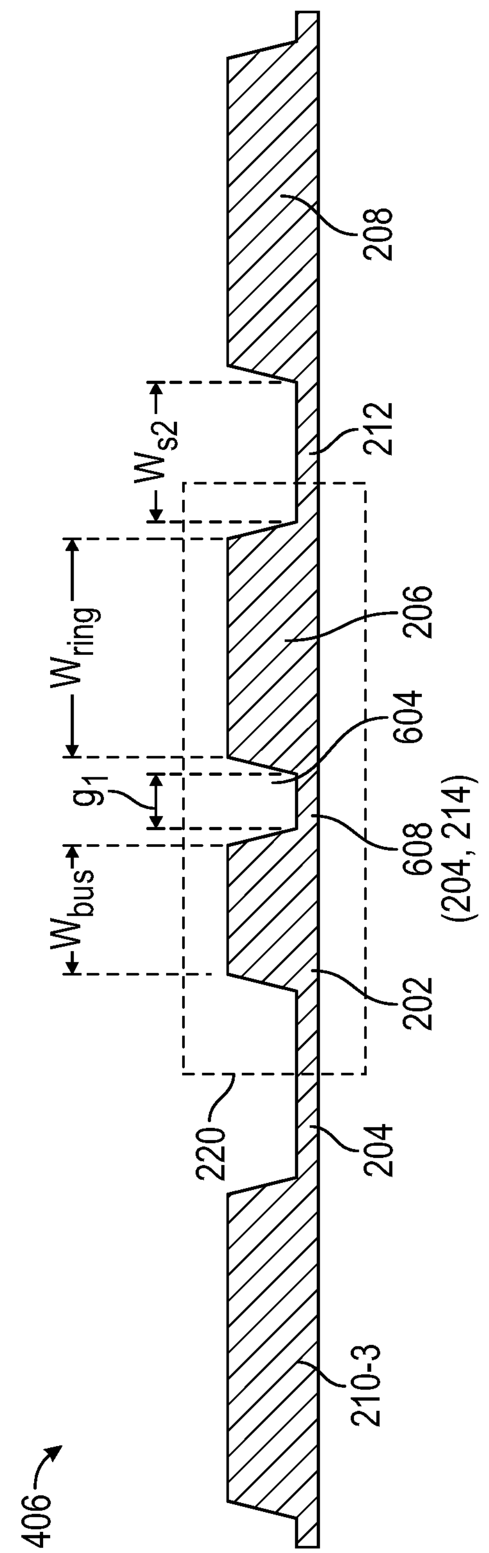
FIG. 6 is a cross-sectional view of the optical layer corresponding to a view 6 in FIG. 3, according to an embodiment.

FIG. 6 is a cross-sectional view of optical layer 406, corresponding to view 6 in FIG. 3, according to an embodiment.

Figure 7:
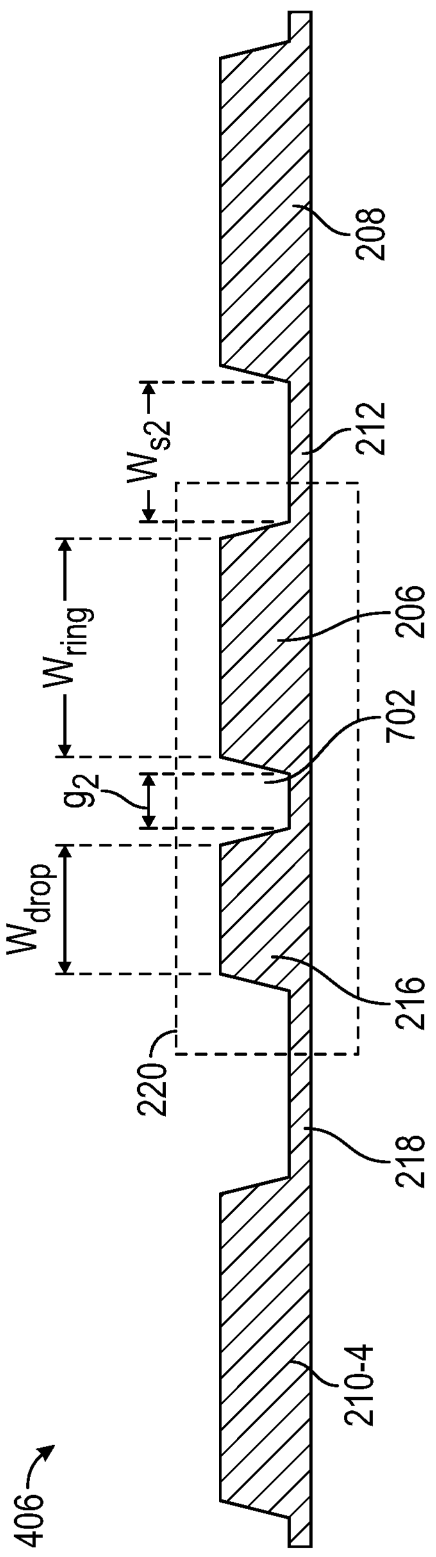
FIG. 7 is a cross-sectional view of the optical layer corresponding to a view 6 in FIG. 3, according to an embodiment.

FIG. 7 is a cross-sectional view of optical layer 406, corresponding to view 7 in FIG. 3, according to an embodiment.

Features of FIGS. 5-7 are described below.

In FIG. 6, optical coupling region 220 (FIG. 2) includes an optical coupling gap 604 that permits optical carrier 104 to cross-over from rib bus waveguide 202 to rib ring waveguide 206 (i.e., guides the optical mode to rib ring waveguide 206).

In an embodiment, rib ring waveguide 206 of MRM 106-1 is configured/tuned to resonate at the wavelength of the first one of optical carriers 104-1 with an optimal detuning. Conceptually, rib ring waveguide 206 disregards (does not affect) remaining ones of optical carriers 104. In this embodiment, rib ring waveguide 206 is further configured via an imbedded PN junction such that, when data signal 108-1 is active, the resonant wavelength of rib ring waveguide 206 shifts slightly away from the wavelength of optical carrier 104-1 resulting in the transmission of optical carrier 104-1 to depend on data signal 108-1, thereby encoding data signal 108-1 on optical carrier 104-1. The shift due to data is sufficient to substantially transmit optical carrier 104-1 through rib ring waveguide 206, but insufficient to make rib ring waveguide 206 resonate at a wavelength of another one of optical carriers 104 (i.e., the shift is much less than the channel spacing).

In another embodiment, rib ring waveguide 206 is configured/tuned to resonate at a wavelength that is slightly shifted from the wavelength of optical carrier 104-1 (i.e., by an amount that is less than the FSR). In this embodiment, rib ring waveguide 206 is further configured such that, when data signal 108-1 is active, the resonant wavelength of rib ring waveguide 206 shifts to the wavelength of optical carrier 104-1.

In either of the foregoing embodiments, as data signal 108-1 alternates between active and inactive states, rib ring waveguide 206 switches between a first state in which rib ring waveguide 206 propagates optical carrier 114-1 and a second state in which rib ring waveguide 206 does not propagate optical carrier 114-1. In this way, rib ring waveguide 206 modulates optical carrier 114-1 with data signal 108. Modulated optical carrier 114-1 then passes from rib ring waveguide 206 to rib bus waveguide 202 over optical coupling gap 504, and propagates towards coupler 110.

Where optical system 100 includes drop waveguide 116, a portion of optical power within rib ring waveguide 206 passes from rib ring waveguide 206 to rib drop waveguide 216 over an optical coupling gap 702 (FIG. 7) and propagates towards photodetector 120.

In an embodiment, rib ring waveguide 206 is doped such that the resonant wavelength is controllable by data signal 108-1. In an embodiment, rib ring waveguide 206 includes a P-doped region (i.e., hole-rich implants) and an adjacent N-doped region (i.e., electron-rich implants). A junction of the P-doped region and the N-doped region is referred to as a PN junction. The PN junction region may be substantially lateral (i.e., perpendicular to a plane of rib ring waveguide 206) or substantially vertical (i.e., parallel to the plane of rib ring waveguide 206), such as described below with reference to FIGS. 8A, 8B, 9A, and 9B.

Figure 8A:
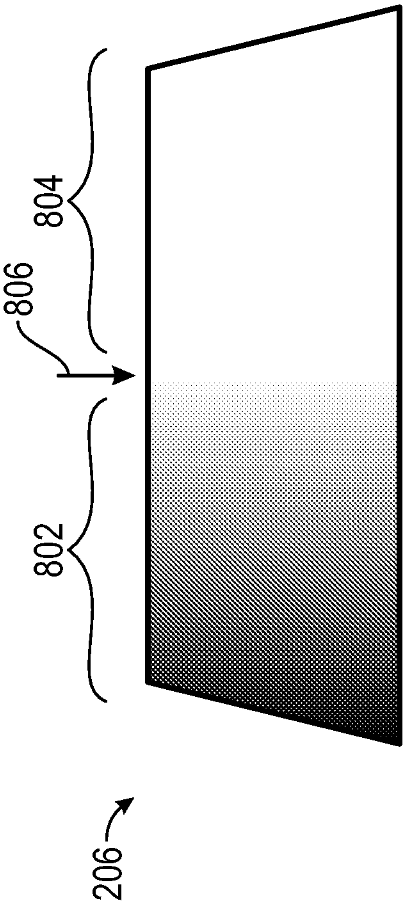
FIG. 8A is a cross-sectional view of a rib ring waveguide with laterally adjacent P and N doped regions, according to an embodiment.

FIG. 8A is a cross-sectional view of rib ring waveguide 206 with laterally adjacent P and N doped regions, according to an embodiment. A shaded region 802 may represent P-doping and an unshaded region 804 may represent N-doping. Alternatively, shaded region 802 may represent N-doping and unshaded region 804 may represent P-doping. Regions 802 and 804 define a lateral PN junction 806.

Figure 8B:
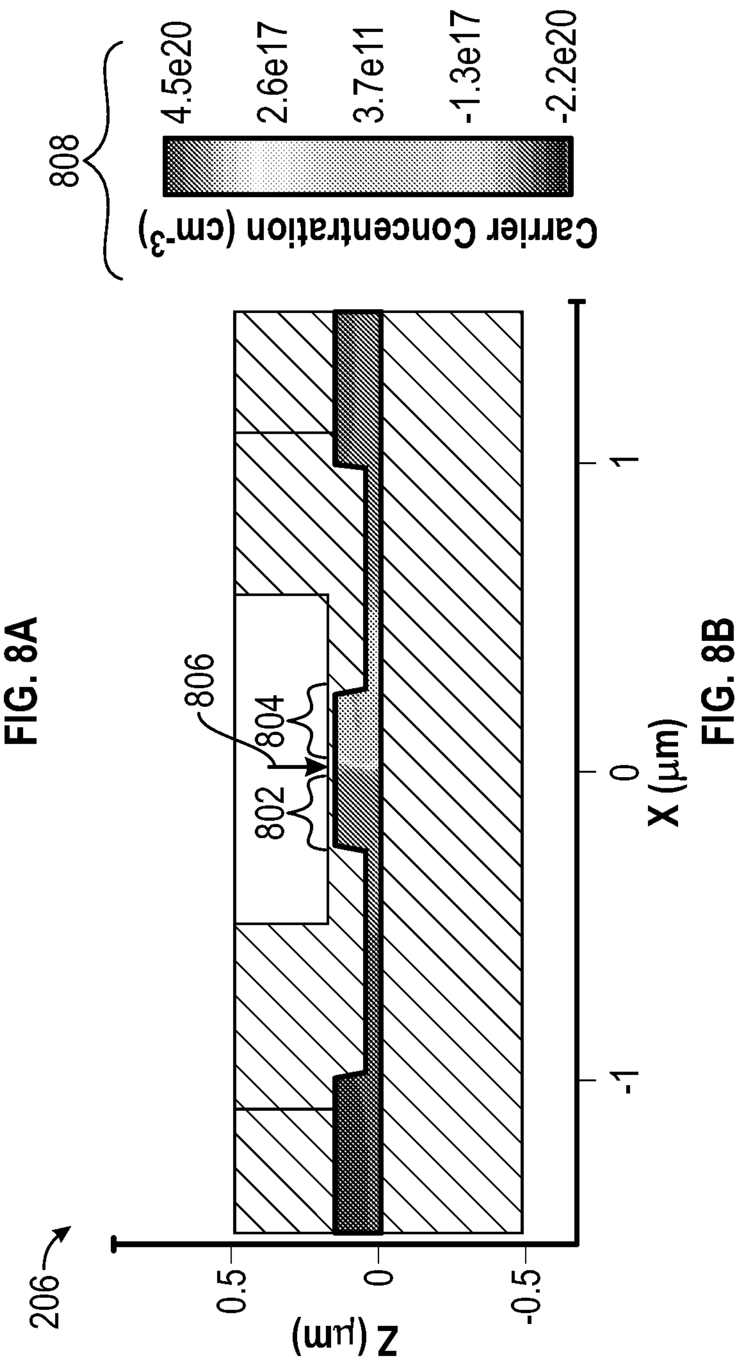
FIG. 8B is a cross-sectional view of the rib ring waveguide of FIG. 8A, when a data signal is active, according to an embodiment.

FIG. 8B is a cross-sectional view of rib ring waveguide 206, with the laterally adjacent regions 802 and 804 of FIG. 8A, when data signal 108 is active, according to an embodiment. FIG. 8B further includes a key 805 of corresponding carrier concentration.

Figure 9A:
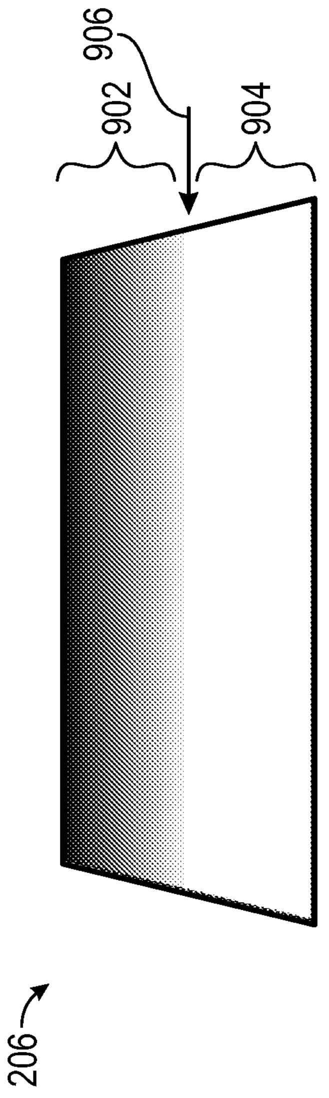
FIG. 9A is a cross-sectional view of a rib ring waveguide with vertically adjacent P and N doped regions, according to an embodiment.

FIG. 9A is a cross-sectional view of rib ring waveguide 206 with vertically adjacent P and N doped regions, according to an embodiment. A shaded region 902 may represent P-doping and an unshaded region 904 may represent N-doping. Alternatively, shaded region 902 may represent N-doping and unshaded region 904 may represent P-doping. Regions 902 and 904 define a vertical PN junction 706.

Figure 9B:
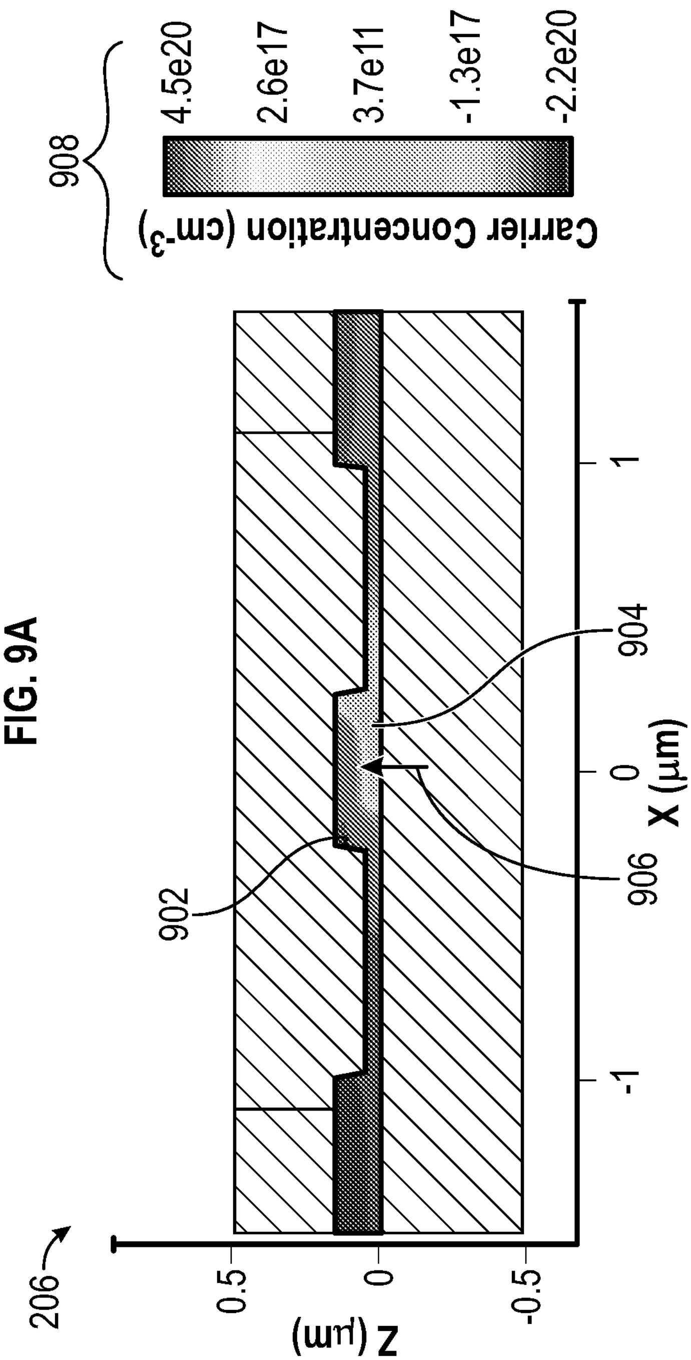
FIG. 9B is a cross-sectional view of the rib ring waveguide of FIG. 9A, when a data signal is active, according to an embodiment.

FIG. 9B is a cross-sectional view of rib ring waveguide 206, with the vertically adjacent regions 902 and 904 of FIG. 9A, when data signal 108 is active, according to an embodiment. FIG. 9B further includes a key 908 of corresponding carrier concentration. In FIG. 9B, region 904 may represent P-doping.

Figure 10:
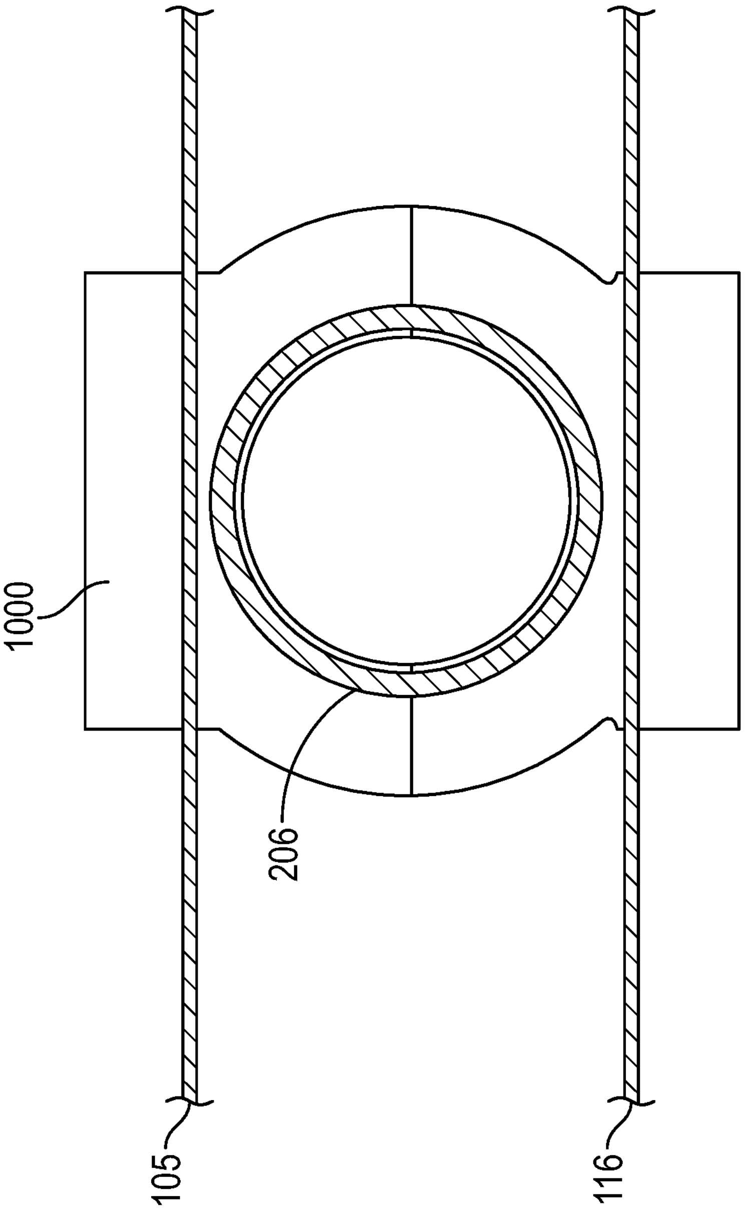
FIG. 10 illustrates an implant mask for doping a region of the optical layer, according to an embodiment.

In an embodiment, a portion of optical layer 406 within region 122 is doped (P-doped or N-doped) to enhance modulation efficiency, such as described below with reference to FIG. 10. FIG. 10 illustrates an implant mask 1000 for doping a portion of optical layer 406 within region 122, according to an embodiment. The portion of optical layer 406 encompassed by mask 1000 may be P-doped or N-doped based on the doping of rib ring waveguide 206. In the example of FIG. 10, implant mask 1000 is designed to dope the entirety of bus waveguide 105 and drop waveguide 166 that fall within region 122. In an embodiment, bus waveguide 105 and drop waveguide 166 are doped from end-to-end (i.e., bus waveguide 105 is doped from laser 102 to optical fiber 114). Further in the example of FIG. 10, implant mask 1000 does not encompass a region within inner radius 322 of rib ring waveguide 206.

Figure 11:
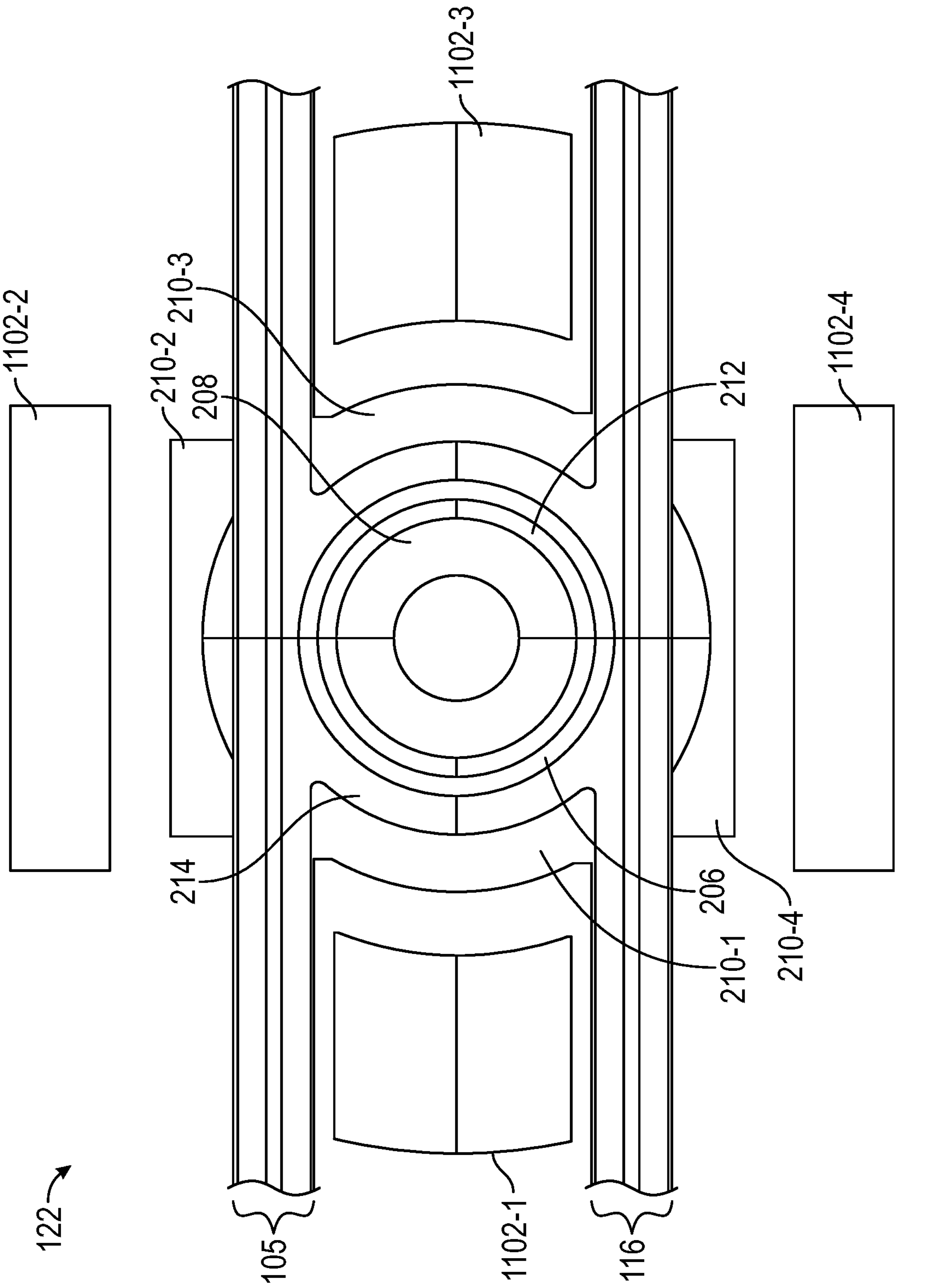
FIG. 11 illustrates the region of FIG. 2, further including heater elements, according to an embodiment.

The index of refraction of silicon is temperature-dependent. Region 122 may further include heater elements to tune the index of refraction of optical layer 406 (FIG. 4) within region 122, such as described below with reference to FIG. 11. FIG. 11 illustrates region 122, further including heater elements 1102-1 through 1102-4 (collectively, heater elements 1102), according to an embodiment. Heater elements 1102 may include resistive heating elements and optical system 100 may further include control circuitry that controls current to heater elements 1102. Heater elements 1102 may include doped silicon, metal (e.g., tungsten), and/or other material. In an embodiment, heater elements 1102 are formed with doped silicon. Heater elements 1102 may be formed or placed within optical layer 406 during fabrication (e.g., by doping regions of optical layer 406). Heater elements 1102 may be positioned adjacent to ribs of region 122, and may be approximately the same height as the ribs. Alternatively, heaters elements 1102 may be positioned above and/or below ribs of region 122, separated by a thin layer (e.g., approximately 1 μm) of dielectric (e.g., silicon dioxide).

Technical issues are addressed below, including FSR, optical coupling efficiency, bending losses (i.e., propagation losses due to optical mode leakage from rib ring waveguide 206 to outer slab 214 and inner slab 212), manufacturing/fabrication, propagation loss and/or insertion loss due to doping of bus waveguide 105, bandwidth, and heating efficiency.

A large FSR helps to prevent channel crossover. Bending losses negatively affect modulation efficiency. There is typically a tradeoff between FSR and bending loss. In order to provide a SOI-based MRM with a large FSR (3.2 THz), radius 320 (FIG. 3) of rib ring waveguide 206 should be very small (e.g., less than 5 μm). A radius less than 5 μm, however, results in bending losses, whereas a radius greater than 5 μm results in lower FSR (e.g., a radius 320 between 5 μm and 10 μm results in a FSR between approximately 1.2-2.4 THz). Techniques avoid bending losses at small radii are described below.

Regarding optical coupling efficiency and manufacturing/fabrication concerns, for a relatively small radius 320 of rib ring waveguide 206, optical coupling efficiency between rib bus waveguide 202 and rib ring waveguide 206 (i.e., at optical coupling region 220) depends in part on a width $W_{bus}$ (FIG. 6) of rib bus waveguide 202 and a width $g_1$ of an optical coupling gap 504 (FIG. 6) between rib bus waveguide 202 and rib ring waveguide 206. Specifically, a narrow width $W_{bus}$ and a narrow width $g_1$ may improve coupling efficiency. A narrow width $W_{bus}$ may also help to ensure single mode operation of bus waveguide 105. Narrowing width $g_1$ may, however, present manufacturing/fabrication challenges.

Regarding propagation loss and/or insertion loss due to doping of bus waveguide 105, although the losses may be relatively small for a single MRM 106, when multiple MRMs 106 are cascaded (e.g., 8 or 16 MRMs), as illustrated in FIG. 1, the losses may accumulate to become relatively substantial losses.

Regarding heating efficiency, heat generated by heater elements 1102 (FIG. 11) may transfer through dielectric layer 404 (FIG. 4) to substrate 402. Where substrate 402 is formed of silicon or other heat conducting material, substrate 402 may dissipate heat generated by heater elements 1102, which wastes power and may affect rib ring waveguides of neighboring MRMs 106.

Regarding bandwidth, a vertical PN junction (e.g., vertical PN junction 906 in FIGS. 9A and 9B), may have more capacitance than a lateral PN junction (e.g., lateral PN junction 806 in FIGS. 8A and 8B). The greater capacitance of a vertical PN junction may reduce a bandwidth of rib ring waveguide 206.

Techniques to address the foregoing technical issues are disclosed below.

I. Ring Waveguide Width

In an embodiment, a width $W_{ring}$ of rib ring waveguide 206 is relatively large. A relatively large width $W_{ring}$ may reduce or avoid bending losses at small radii (e.g., for r less than 5 μm). A relatively large width $W_{ring}$ may also permit a wider vertical PN junction 906 (FIGS. 9A and 9B). In other words, relatively large width $W_{ring}$ may increase an area of vertical PN junction 906 overlapping the mode of rib ring waveguide 206, which may improve modulation efficiency (ME), Width $W_{ring}$ may be wider (e.g., significantly wider) than a width of a single mode straight waveguide for single mode operation, or wider than a width necessary for a straight rib waveguide for a resonant wavelength of rib ring waveguide 206. In an embodiment, where radius 320 is less than 5 μm, width $W_{ring}$ is within a range of 450 nm to 550 nm.

II. Asymmetrical Slab Widths Around the Modulator Ring

In an embodiment, a width $W_{s1}$ (FIG. 4) of outer slab 214 of MRM 106-1 is greater than a width $W_{s2}$ (FIG. 4) of inner slab 212 (i.e., asymmetrical slab widths). A wider $W_{s1}$ may further reduce bending loss. A narrower $W_{s2}$ may help to maintain a relatively low junction serial resistance (FIG. 5). A low junction serial resistance is critical in maintaining a wide RC bandwidth of the junction for high-speed operation. In an embodiment, width $W_{s1}$ is within a range of approximately 1 um to 1.5 um, and width $W_{s2}$ is within a range of approximately 0.3 um to 0.5 um.

III. Dissimilar Rib Ring Waveguide and Rib Bus Waveguide Widths

In an embodiment, a width $W_{bus}$ (FIG. 5) of rib bus waveguide 202 differs from a width $W_{ring}$ of rib ring waveguide 206 (e.g., width $W_{bus}$ may be less than $W_{ring}$). Dissimilar widths $W_{bus}$ and $W_{ring}$ may improve optical coupling efficiency, more so when radius 320 of rib ring waveguide 206 is relatively small. A narrower width $W_{bus}$ may also help to ensure single mode operation of bus waveguide 105. In an embodiment, width $W_{bus}$ is a nominal width necessary for single mode operation for the wavelengths of optical carriers 104. In an embodiment, width $W_{ring}$ is within a range of 450 nm to 550 nm and width $W_{bus}$ is within a range of approximately 350 nm to 400 nm. The range of $W_{ring}$ is bounded below by bending loss and above by the onset of a higher order mode. $W_{ring}$ generally becomes wider for smaller ring radius 320.

In view of the improved coupling efficiency obtained from widths $W_{bus}$ and $W_{ring}$, the width $g_1$ of optical coupling gap 504 (FIG. 5) designed for critical coupling may be well above the minimum width allowed by the design rule, which may be useful for fabrication purposes (e.g., due to fabrication process variations, a smaller width $g_1$ may result in inconsistent widths $g_1$ across multiple MRMs 106).

IV. Notch Structure in the Implantation Mask(s)

In an embodiment, implant mask 1000 (FIG. 10) is altered to avoid doping a portion of bus waveguide 105 proximate to optical coupling gap 604 (FIG. 6). This may be useful to reduce propagation loss in bus waveguide 105.

Figure 12A:
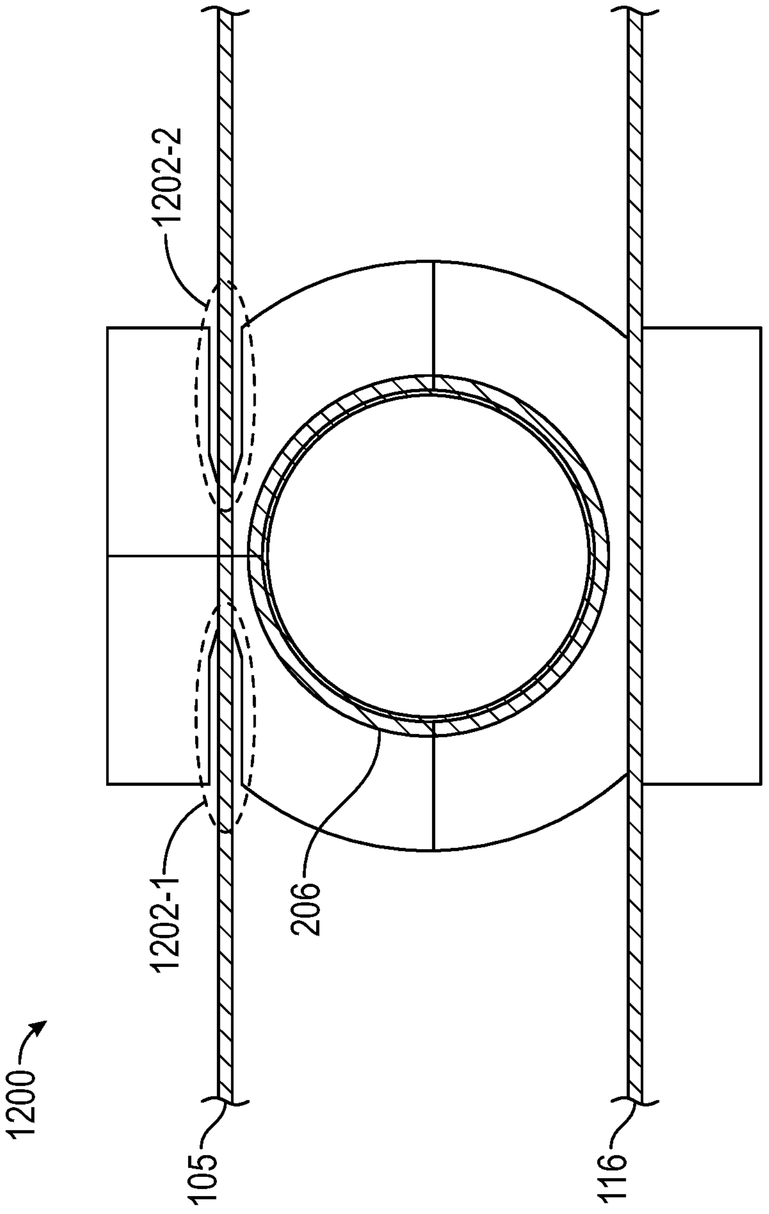
FIG. 12A illustrates another implant mask for doping a region of the optical layer within the region, according to an embodiment.
Figure 12B:
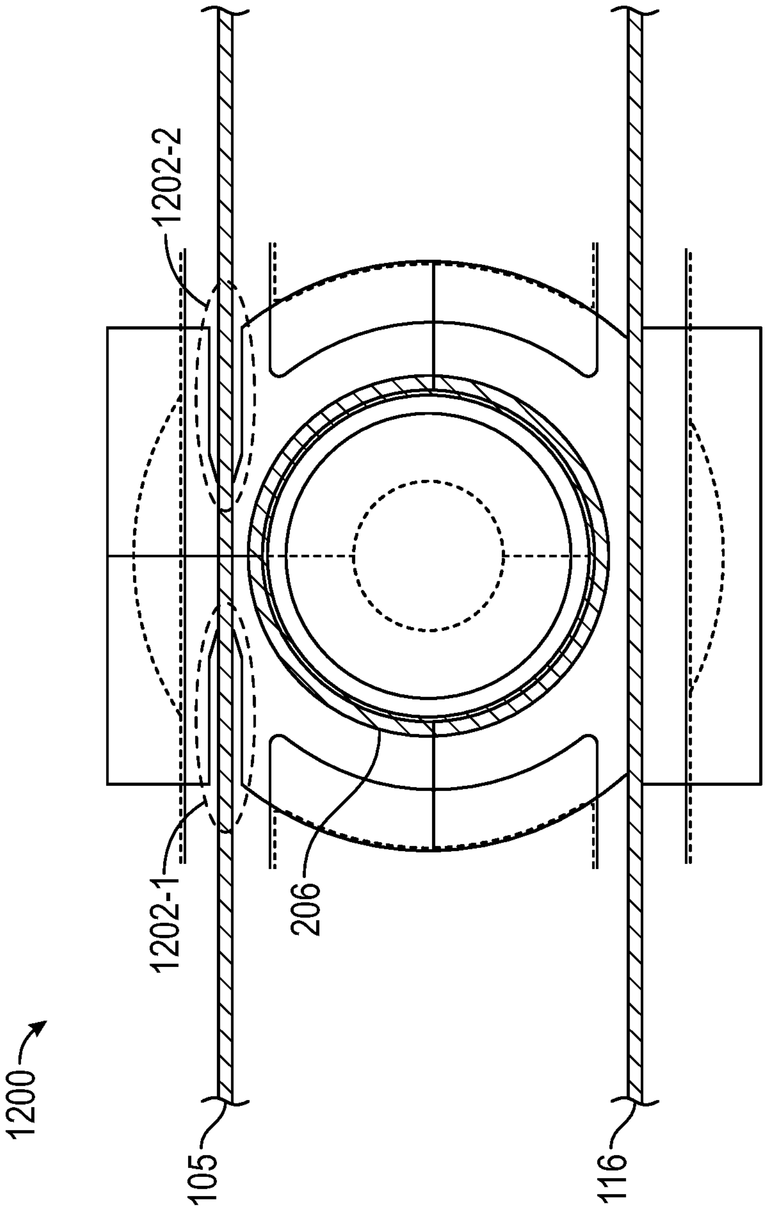
FIG. 12B illustrates the implant mask of FIG. 12A overlaid with outlines of features illustrated in FIG. 2, according to an embodiment.

FIG. 12A illustrates an implant mask 1200 for doping a portion of optical layer 406 within region 122, according to an embodiment. FIG. 12B illustrates implant mask 1200, overlaid with outlines of features described further above with reference to FIG. 2 for illustrative purposes, according to an embodiment. Implant mask 1200 may be substantially similar to implant mask 1000 (FIG. 10) with the exception of notched regions 1202-1 and 1202-2 (collectively, notched regions 1202). In the example of FIGS. 12A and 12B, implant mask 1200 is designed to dope the entirety of bus waveguide 105 that falls within region 122, except for notched regions 1202. As with implant mask 1000, implant mask 1200 does not encompass a region within inner radius 322 of rib ring waveguide 206.

In the example of FIG. 12, notched regions 1202 reduce the doped length of bus waveguide 105 (i.e., the overlap length) by a factor of approximately three relative to the example of FIG. 10, which may reduce propagation loss by a factor of approximately four. The doped length of bus waveguide 105 is not, however, limited to the example of FIGS. 12A and 12B.

Further in the example of FIGS. 12A and 12B, notched regions 1202 do not encompass optical coupling gap 604. In other words, a slab region 608 in FIG. 6 of optical coupling gap 604 is doped. Notched regions 1202 thus do not reduce modulation efficiency. Rather, The MRM's critical coupling condition is maintained, even where width W bus (FIG. 6) of rib bus waveguide 202 differs from width W ring of rib ring waveguide 206. This results in a relatively high Q factor (e.g., 4500), which provide relatively high modulation efficiency (e.g., 30 pmN for vertical PN junction 906 in FIGS. 9A and 9B, and 45 pmN for lateral PN junction 806 in FIGS. 8A and 8B).

Notched regions 1202 also do not affect electrical contact between metal layers of MRM 106-1 (e.g., within layer(s) 410 in FIG. 4) and the first and second sets of electrically conductive contacts of inner contact rib 208 and outer contact rib portions 210.

V. Undercut Layer(s)

In an embodiment, 402 has a cavity to reduce heat dissipation from heater elements 1102 (FIG. 11) to the silicon substrate 402 (FIG. 4), such as described below with reference to FIGS. 13-17.

Figure 13:
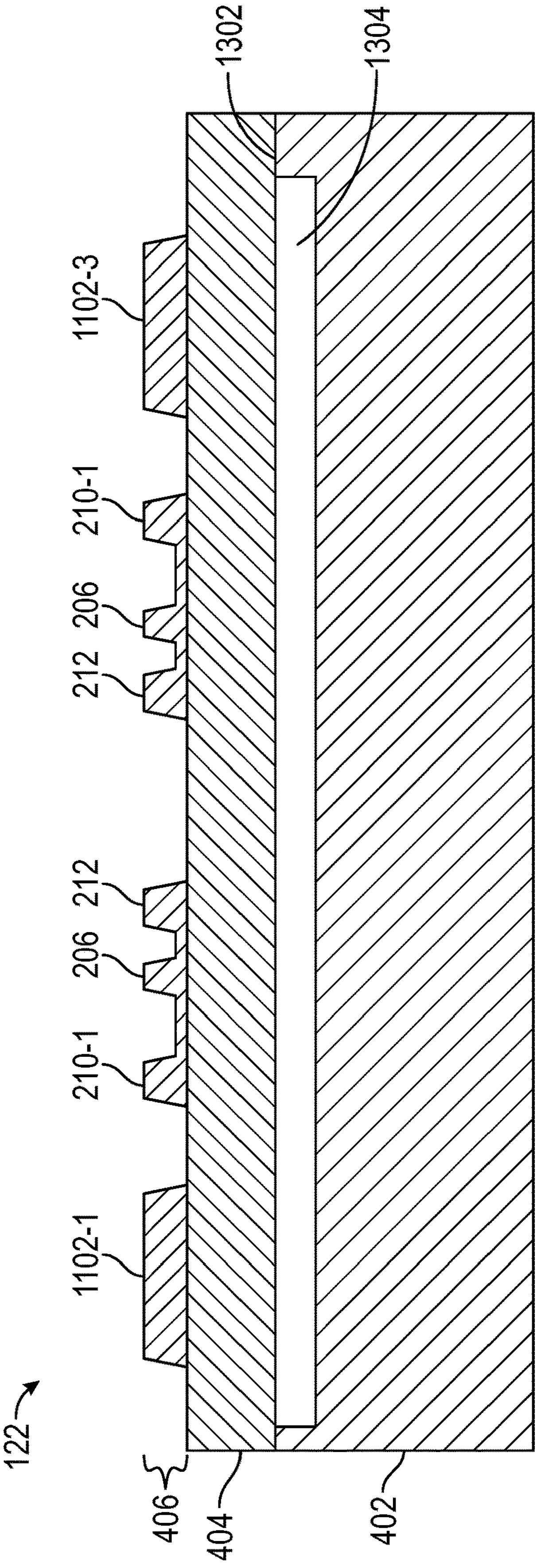
FIG. 13 illustrates the region, corresponding to view 13 in FIG. 3, in which the substrate has an opening in a surface thereof to a cavity therein, according to an embodiment.

FIG. 13 illustrates region 122, corresponding to view 13 in FIG. 3, in which substrate 402 has an opening in a surface 1302 thereof to a cavity 1304 therein, according to an embodiment. Cavity 1304 may encompass an area of region 122 that includes heater elements 1102 (FIG. 12). Cavity 1304 may, for example, extend several micrometers beyond outer edges of heater elements 1102. Cavity 1304 may contain air of a fabrication environment and/or an insulating gas. Cavity 1304 isolates heat from heater elements 1102 from substrate 402, and thus reduces heat dissipation from heater elements 1102 (FIG. 11) to substrate 402. In an embodiment, cavity 1304 improves thermal efficiency by a factor of four. Cavity 1304 is not, however, limited to the foregoing efficiency example. Example techniques to form cavity 1304 are provided below with reference to FIGS. 14 through 17.

Figure 14:
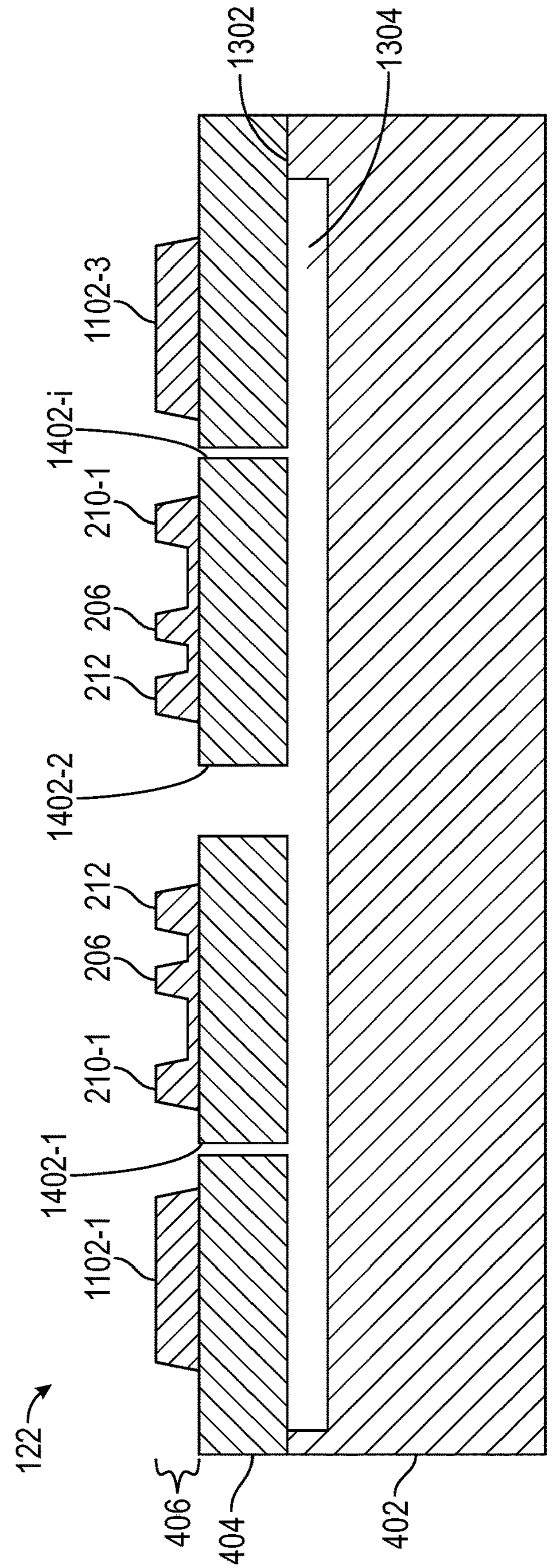
FIG. 14 illustrates the region with slots formed through the dielectric layer to the surface of the substrate in order to form the cavity, according to an embodiment.

FIG. 14 illustrates region 122 in which slots 1402-1 through **1402-*i* (collectively, slots 1402) are formed through dielectric layer 404, to surface 1302 of substrate 402 in order to form cavity 1304, according to an embodiment. Slots 1402 are formed in regions where (silicon) optical layer 406 is fully etched down to dielectric layer 404**.

Figure 15:
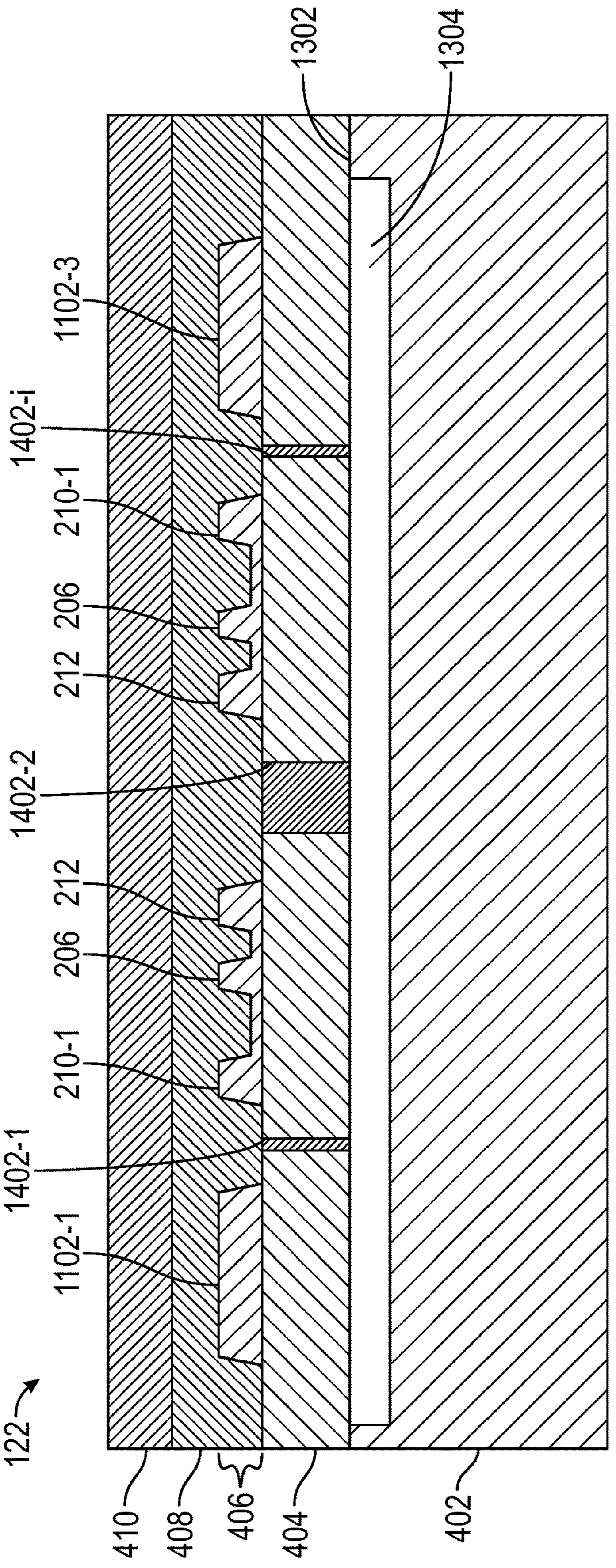
FIG. 15 illustrates the region in which the slots are sealed after forming the cavity, according to an embodiment.

FIG. 15 illustrates region 122 in which slots 1402 are sealed (e.g., with silicon) after forming cavity 1304, according to an embodiment.

Figure 16:
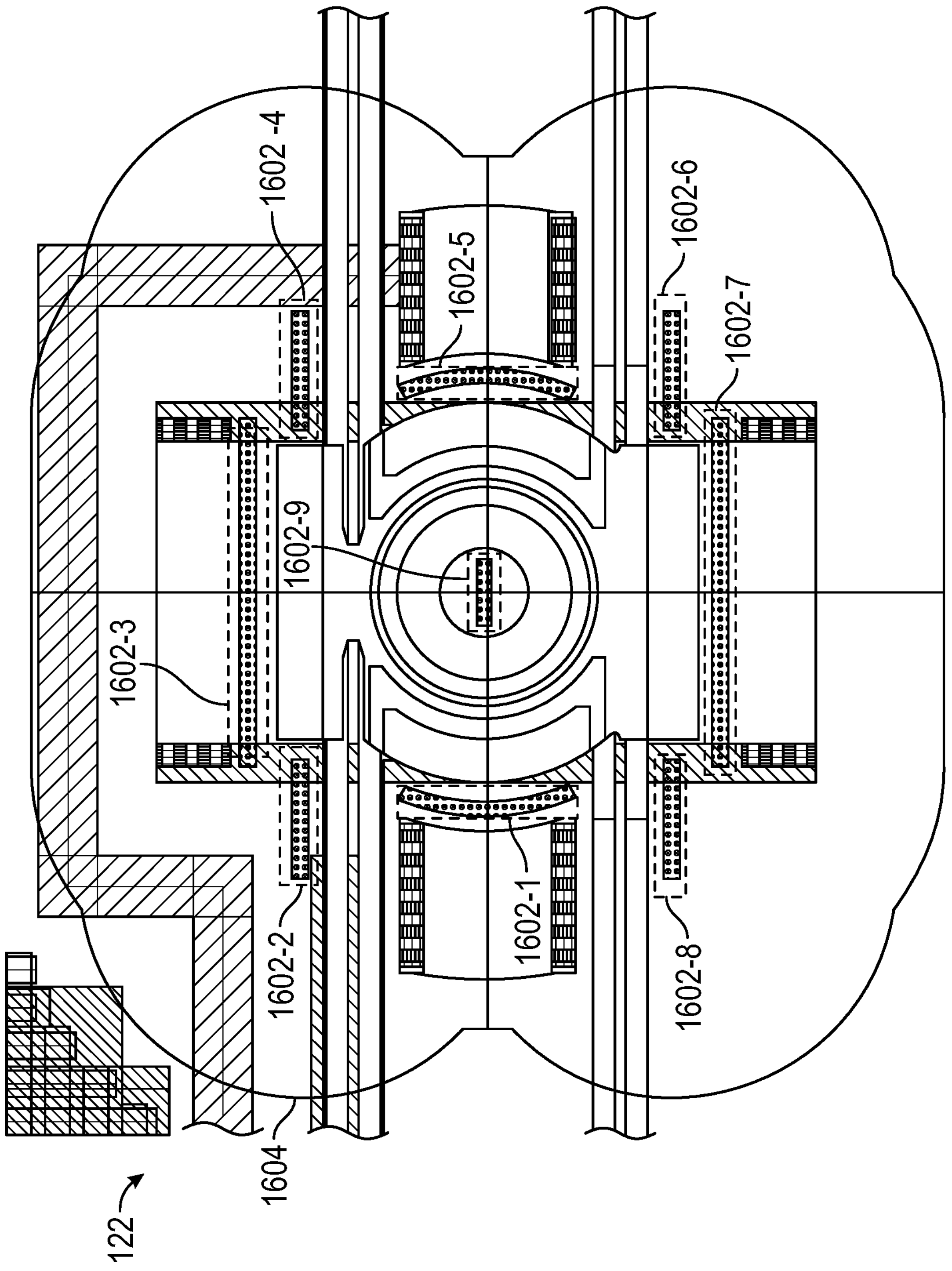
FIG. 16 illustrates the region including regions of the slots, according to an embodiment.

FIG. 16 illustrates region 122 including regions 1602-1 through 1602-9 (collectively, regions 1602) of slots 1402, according to an embodiment.

Figure 17:
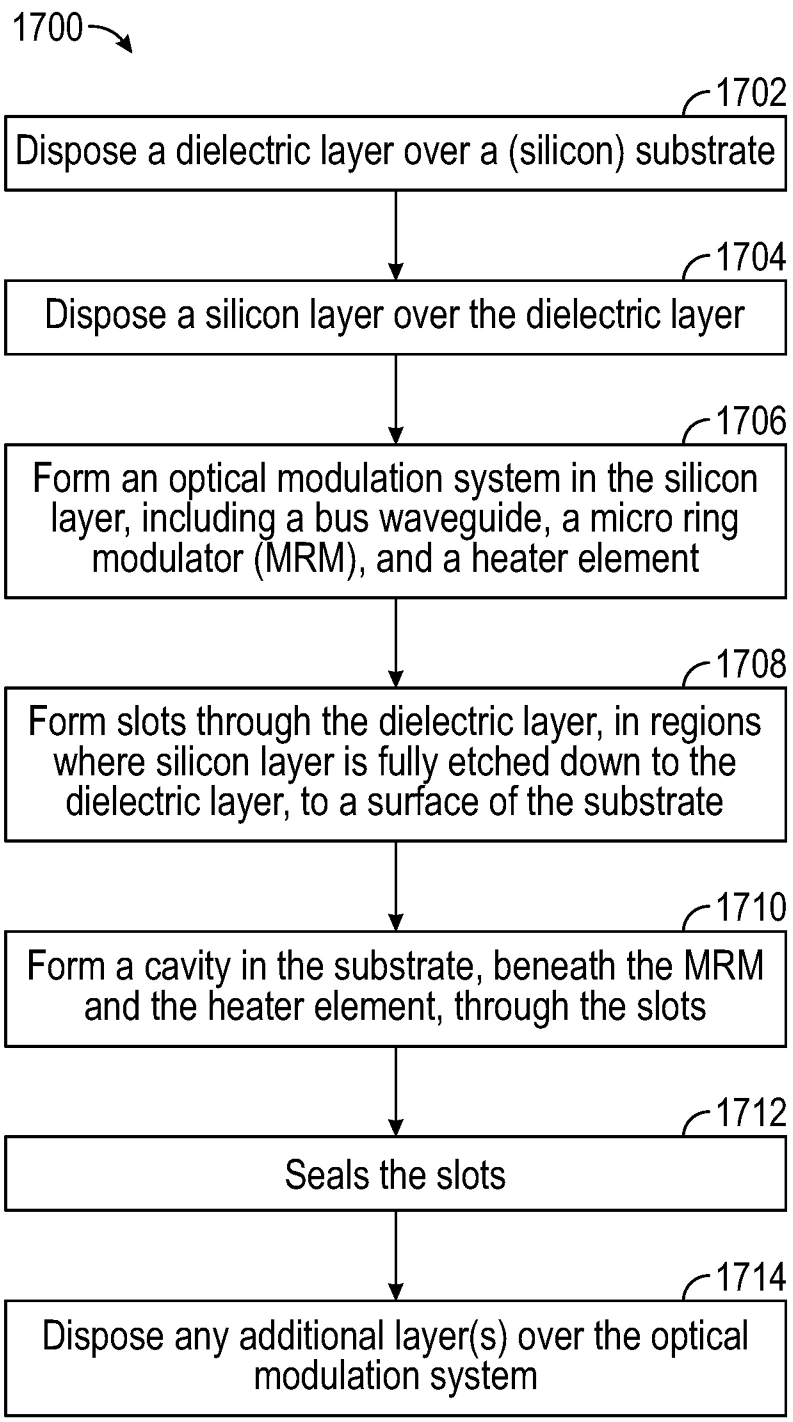
FIG. 17 is a flowchart of a method of forming the cavity, according to an embodiment.

FIG. 17 is a flowchart of a method 1700 of forming cavity 1304, according to an embodiment. Method 1700 is described below with reference to FIGS. 15 and 16. Method 1700 is not, however, limited to the examples of FIGS. 15 and 16.

At 1702, dielectric layer 404 is disposed over silicon substrate 402.

At 1704, (silicon) optical layer 406 is disposed over dielectric layer 404.

At 1706, an optical modulation system (e.g., bus waveguide 105, MRMs 106, drop waveguides 116, and heater elements 1102) is formed in (silicon) optical layer 406 (e.g., via etching and doping).

At 1708, slots 1402 are formed through dielectric layer 404, in regions where (silicon) optical layer 406 is fully etched down to dielectric layer 404.

At 1710, cavity 1304 is formed through slots 1402. Cavity 1304 may be formed with a wet etching process in which an etchant is fed into slots 1402 to form cavity 1304, and resulting etching products exit via slots 1402.

At 1712, slots 1402 are sealed (e.g., with deposited silicon oxide) after cavity 1304 is formed.

At 1714, one or more additional layers (e.g., cladding 408 and layer(s) 410) may be formed over the optical modulation system formed at 1706.

Since slots 1402 are to be sealed after formation of cavity 1304, widths of slots 1402 should be relatively small (e.g., approximately 0.5 μm). At such narrow slot widths, wet etching through a given slot 1402 may form a cavity having a relatively small width (e.g., 10 μm). In order to minimize thermal loss and maximize thermal tuning efficiency, cavity 1304 should be a single, uninterrupted void that extends several microns beyond outer edges of heater elements 1102. Unetched silicon connecting the bottom of dielectric layer 404 to silicon substrate 402 may compromise thermal tuning efficiency of heater elements 1102. In order to form a sufficiently large and uninterrupted cavity 1304, a relatively large number of slots 1402 may be formed in various regions in which (silicon) optical layer 406 is fully etched, such as illustrated in FIG. 16.

In FIG. 16, regions 1602-1, 1602-3, 1602-5 and 1602-7 of slots 1402 are located between outer contact rib portions 210 and heater elements 1102. Regions 1602-2, 1602-4, 1602-6, and 1602-8 of slots 1402 may be useful to extend corner regions of cavity 1304. A relatively small region 1602-9 of slots 1402 at a center of MRM 106-1 may be useful to ensure that there is no silicon bridging (i.e., a narrow pillar of silicon connecting the bottom of dielectric layer 404 to silicon substrate 402) beneath in the center of MRM 106-1.

In FIG. 16, a boundary 1604 may represent an area encompassed by cavity 1304.

VI. Inductor

In an embodiment, MRM 106-1 further includes an on-chip passive inductive component that matches a reactance of a PN junction of rib ring waveguide 206. The inductive component may improve the modulation bandwidth of MRM 106-1. Bandwidth improvement may be more beneficial for a vertical PN junction (e.g., vertical PN junction 906 in FIGS. 9A and **9*b*) because the increased junction area, hence the junction capacitance, to increase the modulation efficiency also increases the RC time constant of the PN junction, which may cause its modulation bandwidth to decrease. The inductive component may be connected in series to the PN junction of MRM 106-1 (e.g., vertical PN junction 906 in FIGS. 9A and 9**B). The on-chip inductive component may be formed with a bi-metal layer having minimum self-capacitance.

Bandwidth reduction of a vertical PN junction design versus a lateral PN junction design as well as bandwidth improvement for a vertical junction MRM from an impedance matching bi-metal inductor formed with a conventional/commercial silicon photonic foundry process is illustrated in FIGS. 18A-18D, 19A, and 19B.

Figure 18A:
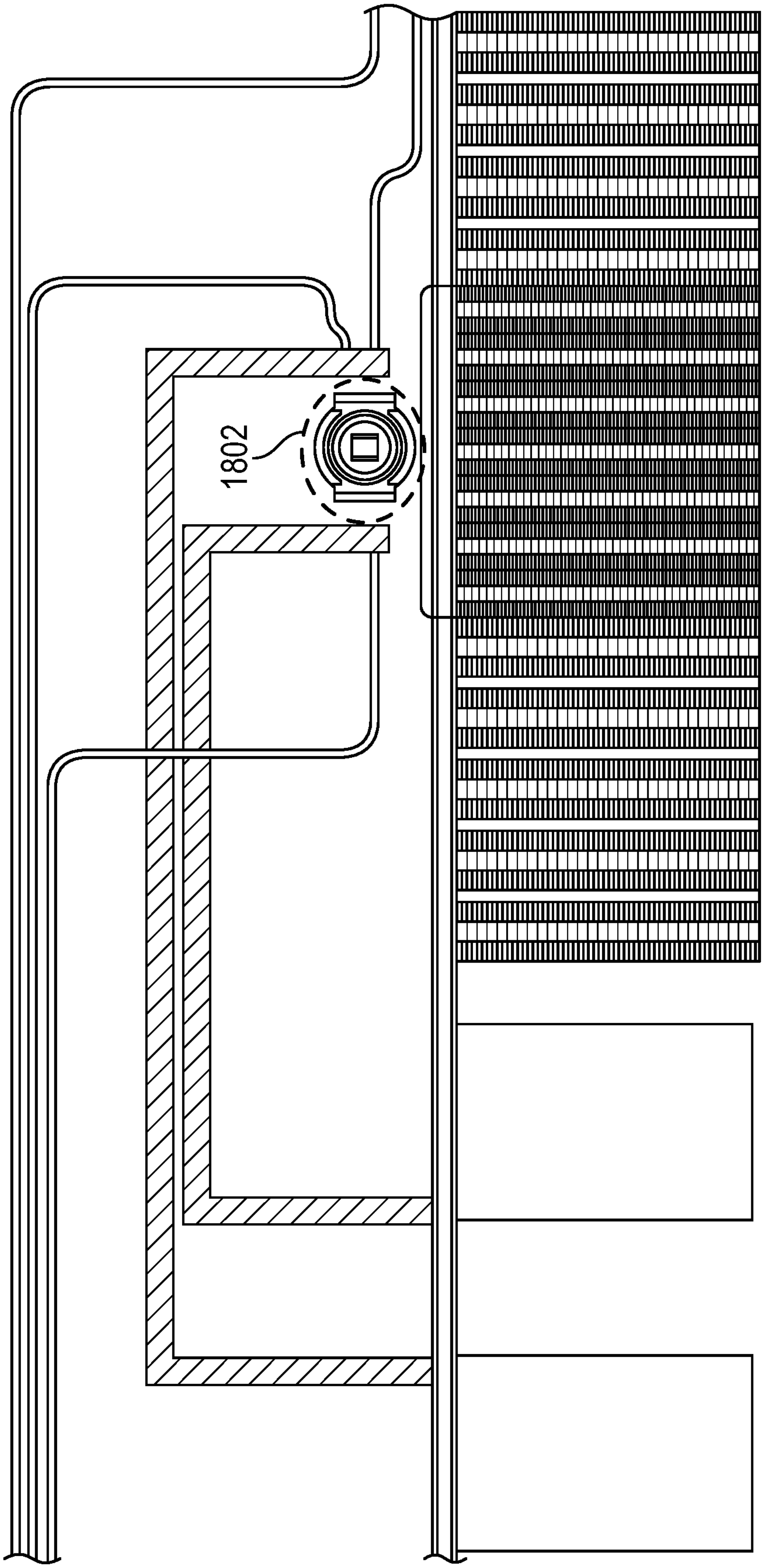
FIG. 18A illustrates a small radius ring waveguide (i.e., an MRM) that has a FSR of 3.2 THz, without an inductive component, according to an embodiment.

FIG. 18A illustrates a small radius rib ring waveguide 1802 that has a FSR of 3.2 THz, without an inductive component.

Figure 18B:
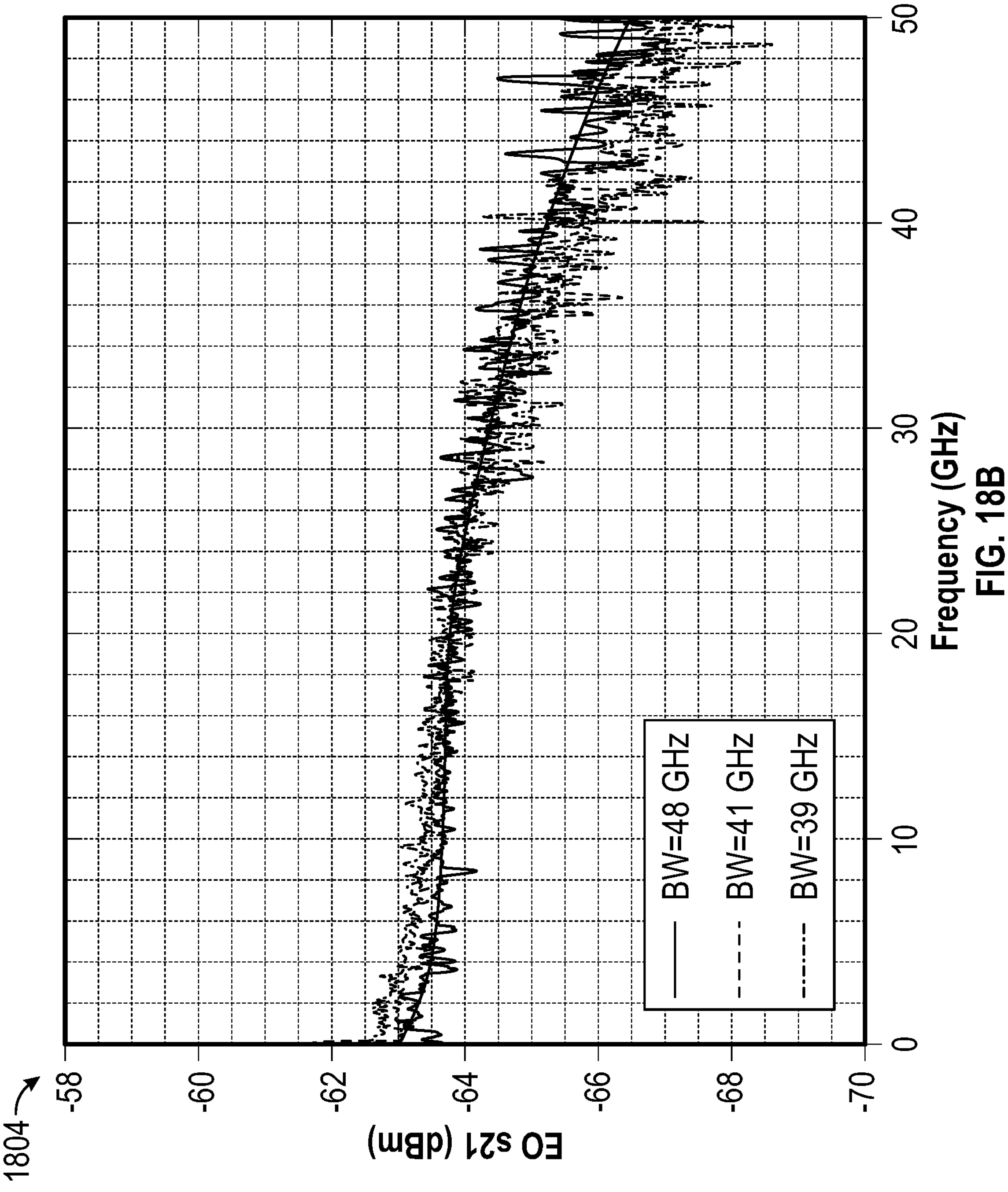
FIG. 18B is an electrical-to-optical S21 graph (from measurement) for the MRM of FIG. 18A, when the ring waveguide has a lateral PN junction and is without a metal inductor, according to an embodiment.

FIG. 18B is an electrical-to-optical S21 graph (from measurement) 1804 for rib ring waveguide 1802, when rib ring waveguide 1802 has a lateral PN junction and is without the metal inductor.

Figure 18C:
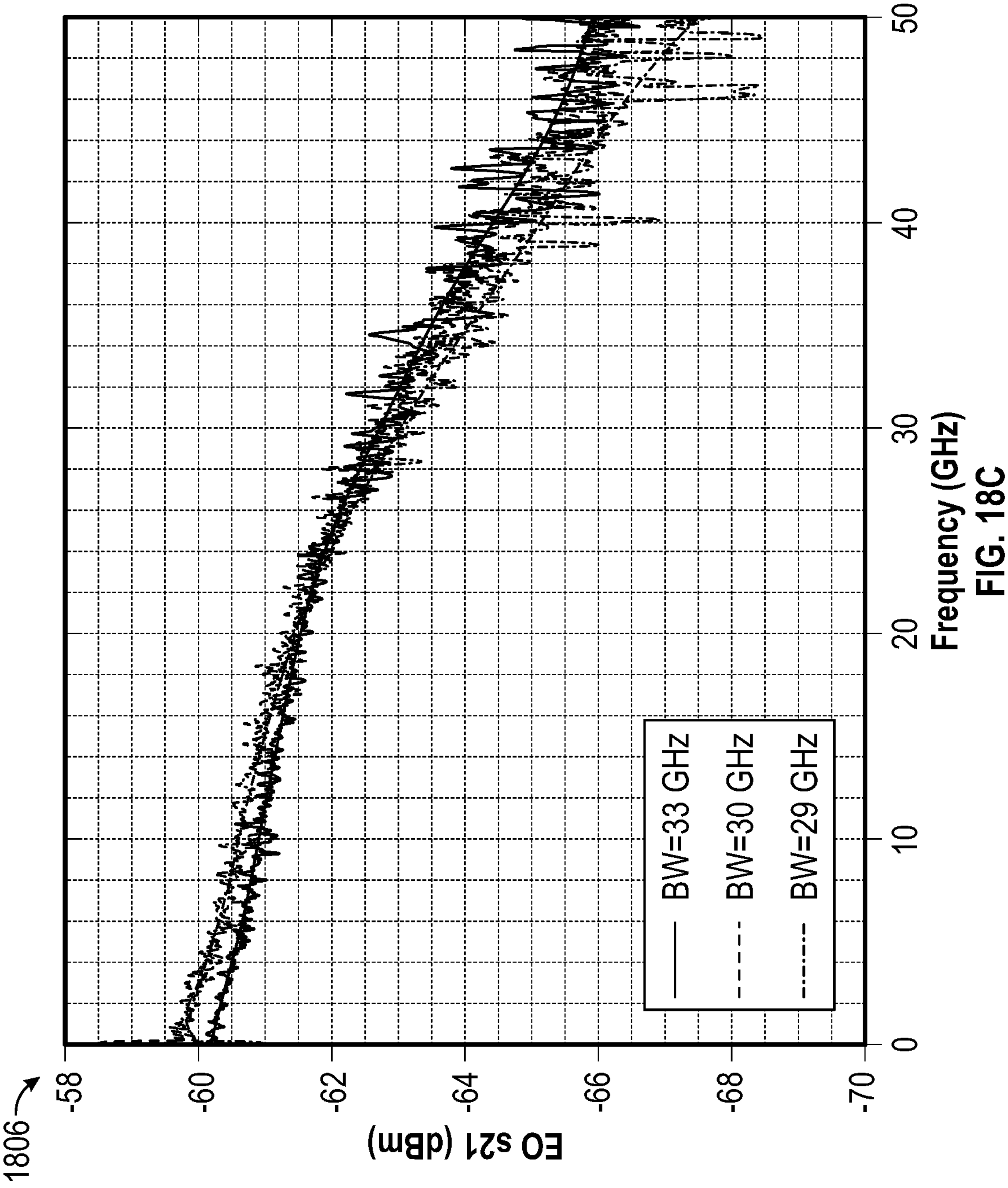
FIG. 18C is an electrical-to-optical S21 graph (from measurement) for the MRM of FIG. 18A when the ring waveguide has a vertical PN junction and is without the metal inductor, according to an embodiment.

FIG. 18C is an electrical-to-optical S21 graph (from measurement) 1806 for rib ring waveguide 1802, when rib ring waveguide 1802 has a vertical PN junction and is without the metal inductor.

Figure 18D:
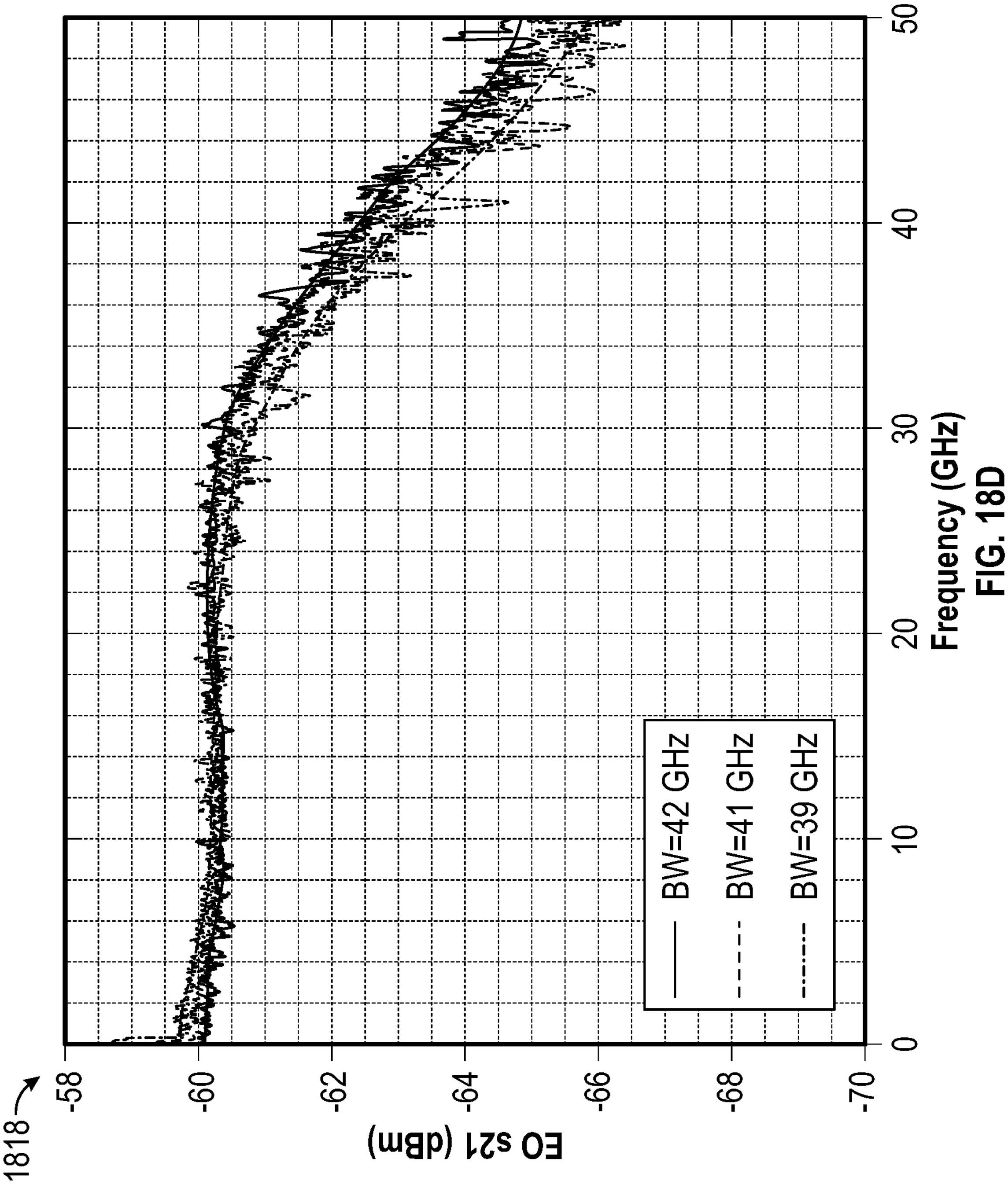
FIG. 18D is an electrical-to-optical S21 graph (from measurement) with inductive peaking for the MRM of FIG. 18A, when the MRM has a vertical PN junction, according to an embodiment.

FIG. 18D is an electrical-to-optical S21 graph (from measurement) 1808 with inductive peaking for rib ring waveguide 1802, when rib ring waveguide 1802 has a vertical PN junction. The bandwidth improvement over 18C is clearly demonstrated.

Figure 19A:
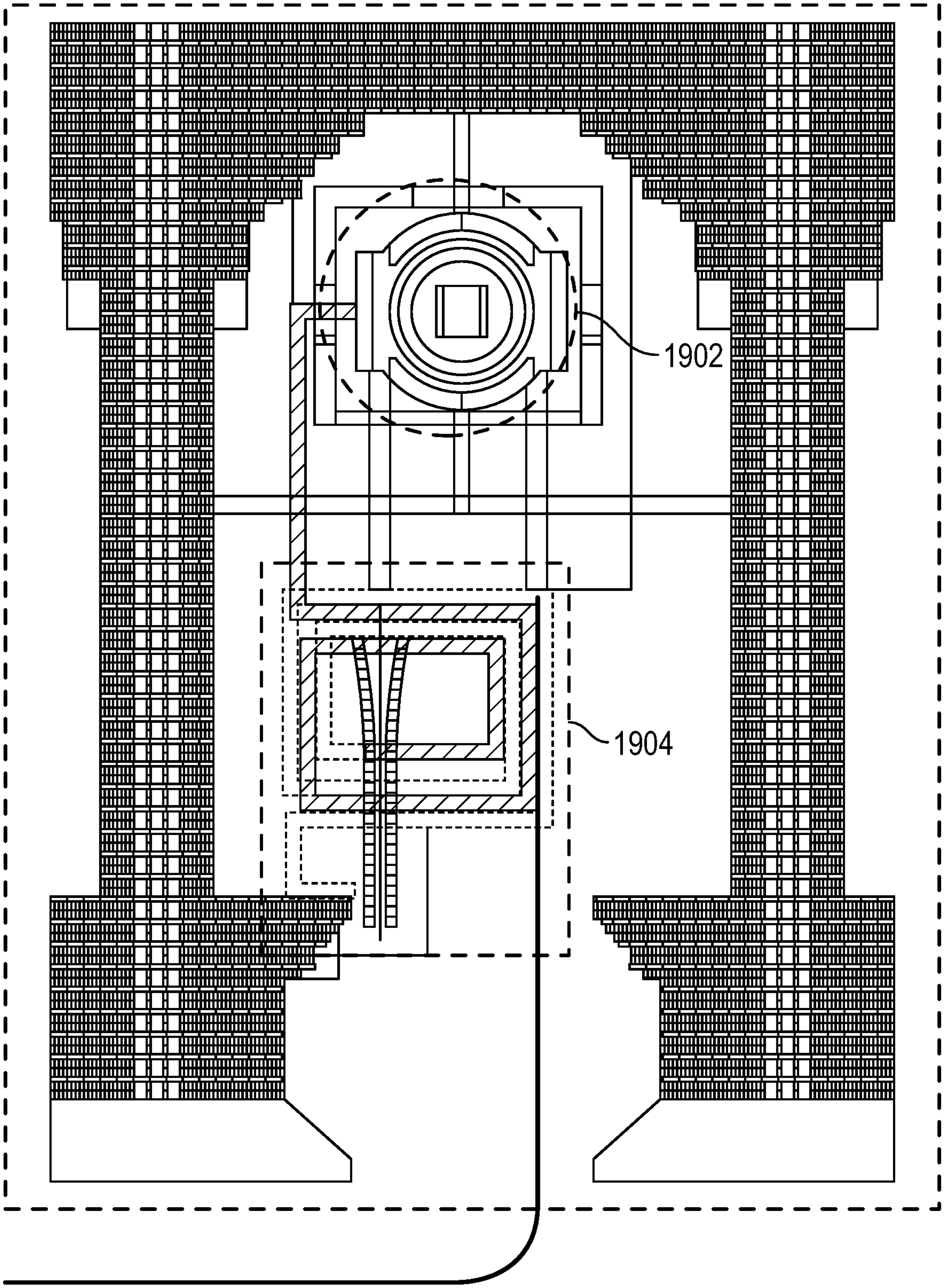
FIG. 19A illustrates a small radius ring waveguide (MRM) that has a vertical PN junction and an inductive component, according to an embodiment.

FIG. 19A illustrates a small radius rib ring waveguide 1902 that has a vertical PN junction, and an inductive component 1904.

Figure 19B:
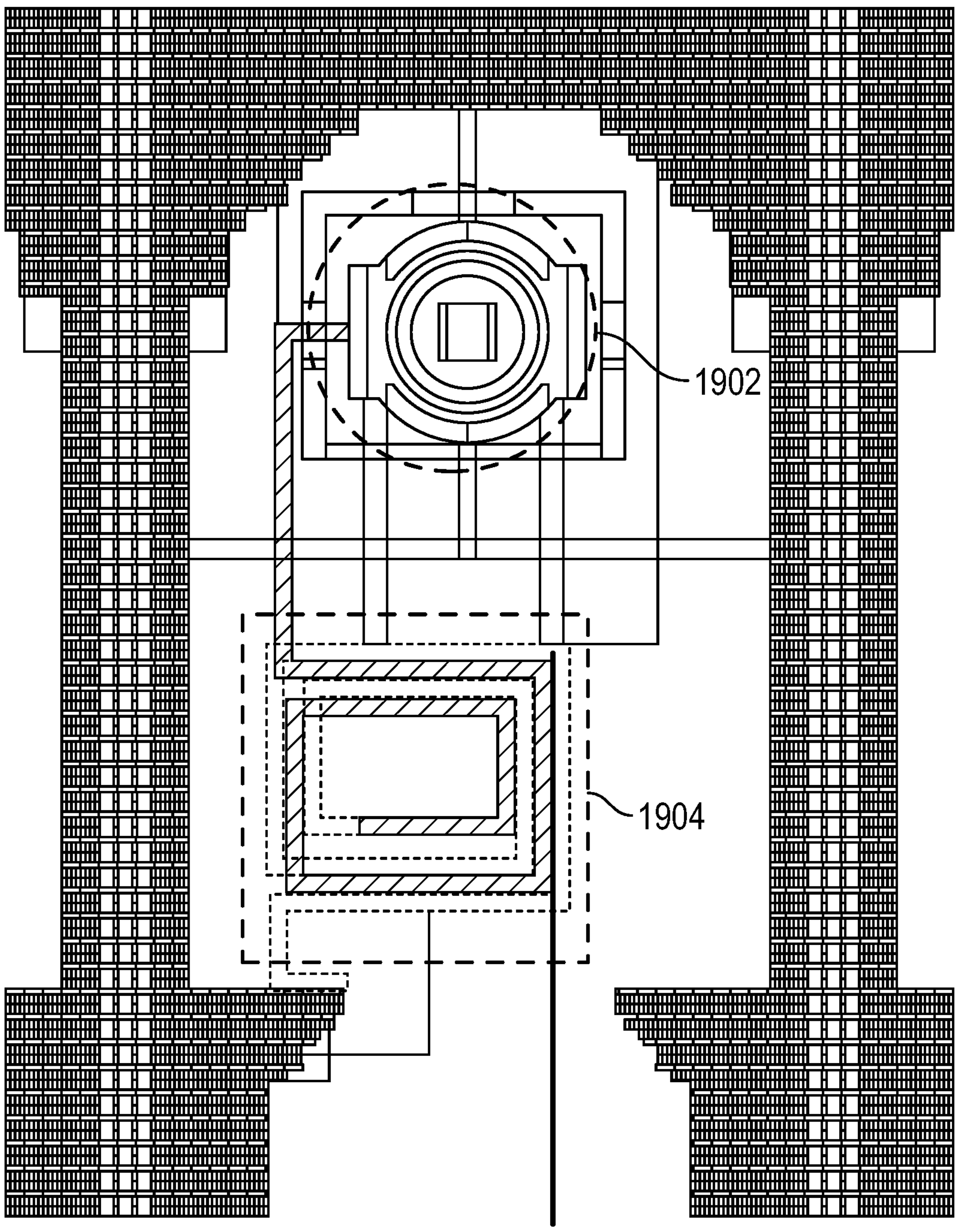
FIG. 19B illustrates an expanded view of the MRM and the inductive component of FIG. 19A, according to an embodiment.

FIG. 19B illustrates an expanded view of rib ring waveguide 1902 and inductive component 1904.

A 350 pH inductive component 1904 occupies an area of approximately 25 μm×25 μm, utilizing two metal layers positioned in respective layers above and below optical layer 406, which provide efficient and compact usage of on-die area. A 350 pico Henry (pH) inductive component 1904 also results in minimum self-capacitance (e.g., 10 fempto Frarads, or fF). A 350 pH inductive component 1904 with minimum self-capacitance enables the high-speed operation (e.g., 56 Gbd) of MRM 106-1 with high bandwidth (e.g., 41 GHz) because of impedance matching. The bandwidth improvement (e.g., by a factor of 1.6 is evident in FIGS. 18C and 18D, from 30 GHz to 41 GHz for a comparable MRM. Passive inductive tuning also cancels parasitics of MRM 106-1, which improves modulation efficiency. This directly improves a link power budget due to a higher optical modulation amplitude (OMA).

Figure 20:
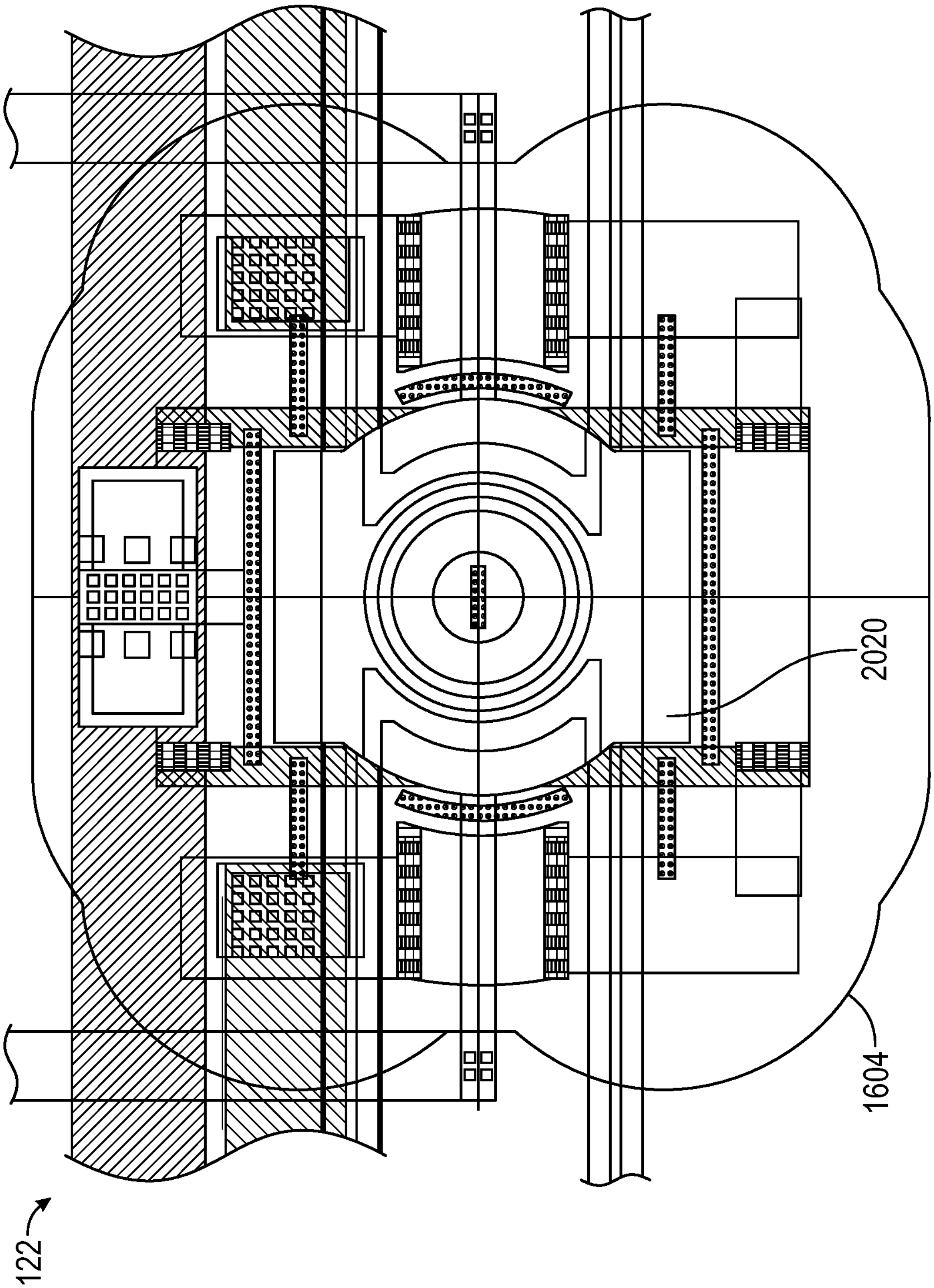
FIG. 20 illustrates the region of the optical system, including metal overlay layers and other implants disclosed herein.

FIG. 20 illustrates region 122, including metal overlay layers 2002 and other implants disclosed herein.

Techniques disclosed above may be implemented without imparting a curvature or altering a radius of a curvature of bus waveguide 105 or drop waveguide 116, which may be helpful to avoid complicating a design and/or fabrication process.

Techniques disclosed above may be used alone or in various combinations with one another.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The figures illustrate architecture, functionality, and operation of possible implementations according to various examples presented herein In this regard, an element in the figures may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An apparatus, comprising:

a substrate; and a layer of silicon disposed above the substrate comprising an optical modulation system that comprises a bus waveguide configured to propagate an optical carrier and a ring modulator configured to modulate the optical carrier;

wherein the ring modulator comprises:

a rib ring waveguide adjacent to the bus waveguide;

an inner contact rib disposed within an inner radius of the rib ring waveguide; and an outer contact rib disposed beyond an outer radius of the rib ring waveguide, wherein the ring modulator is further configured to modulate the optical carrier based on an electrical signal applied to metal contacts of the inner contact rib and the outer contact rib;

an inner slab between the inner radius of the rib ring waveguide and the inner contact rib; and an outer slab between an outer radius of the rib ring waveguide and the outer contact rib, wherein a width of the outer slab is greater than a width of the inner slab.

2. The apparatus of claim 1, wherein a width of the rib ring waveguide is greater than a minimum width of a straight waveguide rib for a resonant wavelength of the rib ring waveguide.

3. The apparatus of claim 1, wherein a width of the rib ring waveguide is within a range of 450 nanometers to 550 nanometers.

4. The apparatus of claim 1, wherein:

the width of the outer slab is within a range of 1 micrometer to 1.5 micrometers; and the width of the inner slab is within a range of 0.3 micrometers and 0.5 micrometers.

5. The apparatus of claim 1, wherein the bus waveguide comprises a rib bus waveguide, and wherein a width of the rib ring waveguide is greater than a width of the rib bus waveguide.

6. The apparatus of claim 5, wherein:

the width of the rib ring waveguide is within a range of 450 nanometers to 550 nanometers; and the width of the rib bus waveguide is within a range of 350 nanometers to 400 nanometers.

7. The apparatus of claim 1, wherein:

a first region of the rib ring waveguide is P-doped and a second region of the rib ring waveguide is N-doped to provide a PN junction that is perpendicular to a plane of the rib ring waveguide.

8. The apparatus of claim 1, wherein:

a first region of the rib ring waveguide is P-doped and a second region of the rib ring waveguide is N-doped to provide a PN junction that is parallel with a plane of the rib ring waveguide.

9. The apparatus of claim 8, further comprising:

an inductive component coupled to the PN junction and configured to match a reactance of the PN junction.

10. The apparatus of claim 9, wherein the inductive component comprises a first metal sheet disposed above the layer of silicon and a second metal sheet disposed below the layer of silicon.

11. The apparatus of claim 1, wherein the layer of silicon further comprises:

a first doped region within an inner radius of the rib ring waveguide; and a second doped region beyond an outer radius of the rib ring waveguide;

wherein the first doped region is doped with one of P-type doping and N-type doping and the second doped region is doped with a remaining one of the P-type doping and N-type doping;

wherein the bus waveguide comprises a rib bus waveguide;

wherein the second doped region includes a slab at an optical gap between the rib bus waveguide and the rib ring waveguide; and wherein the second doped region further includes at least a first portion of the rib bus waveguide that is adjacent to the slab at the optical gap.

12. The apparatus of claim 11, wherein the layer of silicon further comprises:

first and second undoped regions that include respective second and third portions of the rib bus waveguide on either side of the first portion of the rib bus waveguide.

13. The apparatus of claim 1, further comprising:

a heater element proximate to the ring modulator:

wherein an upper surface of the substrate has an opening to a cavity therein; and wherein perimeters of the opening and the cavity encompass regions of the optical modulation system that include the heater element and the ring modulator.

14. An apparatus, comprising:

a substrate; and a layer of silicon disposed above the substrate comprising an optical modulation system that comprises a bus waveguide configured to propagate multiple optical carriers simultaneously and multiple ring modulators configured to modulate respective ones of the optical carriers;

wherein the ring modulators comprise respective rib ring waveguides adjacent to and disposed along a length of the bus waveguide;

wherein a first one of the ring modulators further comprises:

an inner contact rib disposed within an inner radius of a first one of the rib ring waveguides;

an outer contact rib disposed beyond an outer radius of the first rib ring waveguide;

an inner slab between the inner radius of the first rib ring waveguide and the inner contact rib; and an outer slab between an outer radius of the first rib ring waveguide and the outer contact rib, wherein a width of the outer slab is greater than a width of the inner slab; and wherein the first ring modulator is further configured to modulate a first one of the optical carriers based on an electrical signal applied to metal contacts of the inner contact rib and the outer contact rib.

15. The apparatus of claim 14, wherein the optical modulation system has a free spectral range of 3.2 tera Hertz, a channel spacing of 200 GHz, and a bandwidth of at least 40 GHz.

16. The apparatus of claim 14, wherein widths of the rib ring waveguides are within a range of 450 nanometers to 550 nanometers greater than a minimum width of a single mode straight/linear waveguide for single mode operation.

17. The apparatus of claim 14, wherein the bus waveguide comprises a rib bus waveguide having a width that is less than widths of the rib ring waveguides.

18. The apparatus of claim 14, wherein:

first regions of the rib ring waveguides are P-doped and second regions of the rib ring waveguides are N-doped to provide respective PN junctions that are parallel with a plane of the rib ring waveguides; and the ring modulators further comprises inductive elements coupled to the PN junctions configured to match reactances of the respective PN junctions.

* * * * *